US008161016B2

(12) United States Patent  (10) Patent No.: US 8,161,016 B2
Masuda  (45) Date of Patent: Apr. 17, 2012

(54) CONTROLLING EXECUTION OF TRANSACTIONS

(75) Inventor: Hiromi Masuda, Osaka (JP)

(73) Assignee: International Business Machines Corporation, Armonk, NY (US)

( * ) Notice: Subject to any disclaimer, the term of this patent is extended or adjusted under 35 U.S.C. 154(b) by 669 days.

(21) Appl. No.: 12/336,485

(22) Filed: Dec. 16, 2008

(65) Prior Publication Data

US 2009/0106329 A1  Apr. 23, 2009

(30) Foreign Application Priority Data

Apr. 17, 2008 (JP) ................................. 2008-107466

(51) Int. Cl.
*G06F 17/30* (2006.01)
(52) U.S. Cl. ........................................ 707/703; 707/826
(58) Field of Classification Search ............... 707/703, 707/826, 999.107
See application file for complete search history.

(56) References Cited

U.S. PATENT DOCUMENTS

| 4,878,167 | A | | 10/1989 | Kapulka |
| 5,327,556 | A | * | 7/1994 | Mohan et al. ................. 707/695 |
| 5,813,016 | A | | 9/1998 | Sumimoto |
| 6,012,094 | A | | 1/2000 | Leymann |
| 6,014,673 | A | * | 1/2000 | Davis et al. ........................... 1/1 |
| 7,207,034 | B2 | | 4/2007 | Burke |
| 2003/0145103 | A1 | * | 7/2003 | Pruyne et al. ................. 709/237 |
| 2005/0228834 | A1 | | 10/2005 | Shinkai |

FOREIGN PATENT DOCUMENTS

JP  09-204338  5/1997

* cited by examiner

*Primary Examiner* — Leslie Wong
(74) *Attorney, Agent, or Firm* — Anthony V. S. England; William Steinberg

(57) ABSTRACT

A requester includes a business process history DB having recorded therein GBPIDs, input messages, and provider names, and each of providers includes a log DB having recorded therein log data containing DBPIDs and images before updates of the DB. Moreover, in the requester, an UNDO information creator and a REDO information creator refer to the business process history DB to respectively create UNDO information and REDO information for the provider in charge of the business process of a GBPID after the modification REDO. Furthermore, in the provider, an UNDO processor and a REDO processor refer to the log DB to respectively perform UNDO and REDO processes.

10 Claims, 15 Drawing Sheets

(a)
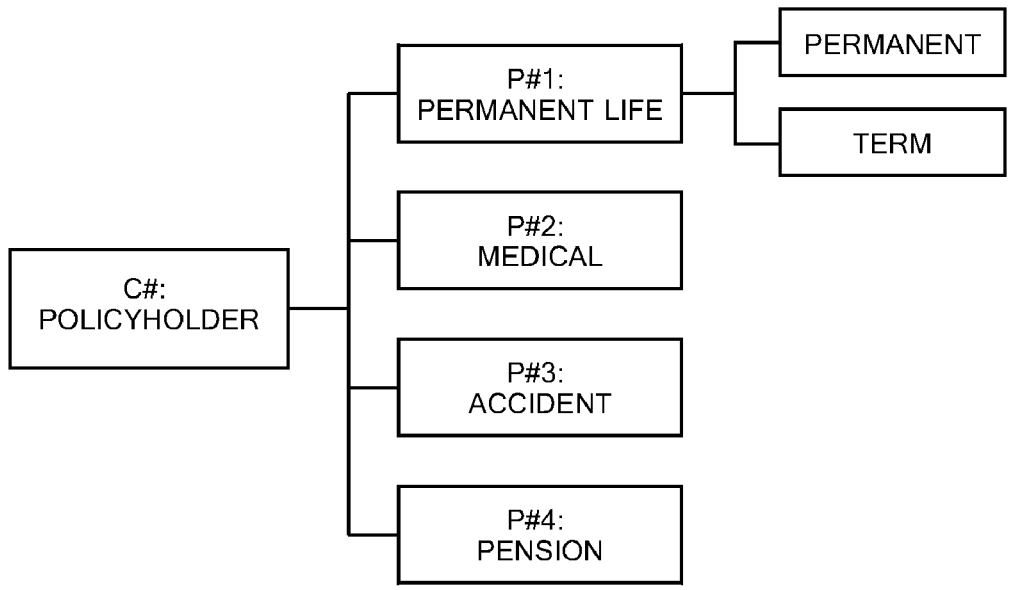
(b)
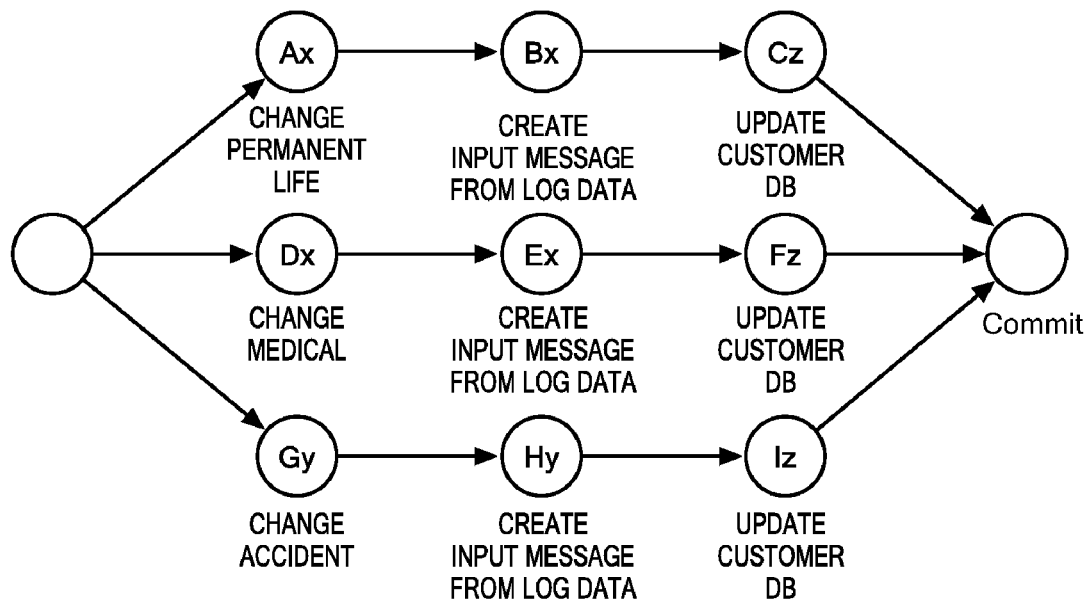
FIG. 5

CONTROLLING EXECUTION OF TRANSACTIONS

The present invention contains matter entitled to the benefit of the priority date of, and with regard to that matter hereby claims the benefit of the priority date of, application 2008-107466, which was filed in the Japanese Patent Office on Apr. 17, 2008.

BACKGROUND OF THE INVENTION

The present invention relates to controlling the execution of transactions in computer systems, and particularly relates to controlling the execution of multiple computer system processes for each transaction.

A transaction is a unit of work implemented in a combination of multiple processes. In some cases, an already-committed transaction needs to be canceled (UNDO) and re-executed (REDO) (hereinafter referred to as "UNDO/REDO"). For example, such operations are required when errors in the past administrative process, such as an error made by a customer himself/herself and an input error in the administrative process, are noticed and are needed to be corrected.

Various techniques have conventionally been proposed for such cancellation and re-execution of a transaction.

In Japanese Unexamined Patent Application Publication No. Sho 63-10252, log data are recorded in a partitioned fashion by a unit of recovery (UR) in a transaction recovery stream (TRS) and are classified into subsets according to functions (BEGIN, COMMIT, ABORT, END, REDO, and UNDO). Then, in response to UR state changes (COMMIT/ABORT), the subsets (REDO or UNDO) of the log data in a given UR partition on the TRS is mapped into a resource recovery stream (RRS). At the termination of the UR state changes, all log data belonging to the given partition is discarded from the TRS by using the RRS.

In Japanese Patent Application Publication No. Hei 9-204338, when a failure occurs during recovery, a preset number of compensation operations are first performed, and then, a NextundoVSN record, which includes a sequential number of an audit record currently scanned, is written in a log. While the log is scanned backward after the failure, records from the NextundoVSN record to the audit record having the sequential number included in the NextundoVSN record are ignored.

In International Patent Publication No. WO/2004/055674, log data showing the progress of transaction processing is recorded in a log file accessible by all distributed transaction processors constituting a distributed transaction processing system. When a failure occurs in one of the distributed transaction processors, the log data stored in the log file is used to perform a failure recovery operation on the transaction related to the distributed transaction processor in which the failure has occurred. After the recovery from the failure, the log data stored in the log file is used to resume the processing of a local transaction interrupted by the failure.

Moreover, techniques related to a database (DB) update, which is an example of a process included in a transaction, include the following. One technique (for example, refer to Japanese Patent Application Publication No. Hei 8-235046) is one not needing a lock mechanism for shared data. In this technique, an update result of shared data is written into update storage, and in the meantime, an operation of referencing to the shared data is performed by referring to the shared data of the previous version stored in a shared storage. Another technique (for example, refer to Japanese Patent Application Publication No. Hei 10-69418) is for guaranteeing the atomic execution of a global transaction. In this technique, the global transaction configured as a whole of group of transactions is performed as a set of chained hierarchy.

Furthermore, one technique related to UNDO and REDO (for example, refer to Japanese Patent Application Publication No. 2005-18774) is for automatically creating and tracking UNDO information so that a developer of a user interface object would not have to be responsible for the creation and the tracking of the UNDO information.

However, in spite of the above teachings there is need for improvement with regard to performing UNDO/REDO in an environment where multiple processes provided by multiple providers are performed in response to a request of a requester.

SUMMARY OF THE INVENTION

Among other matters, the present invention addresses the above mentioned need for improvement. This includes providing an apparatus for controlling the execution of a plurality of transactions in each of which one or more processes provided by one or more providers are performed in response to a request of a requester. In the apparatus, the requester comprises: a first storage for storing therein first history information showing a provider requested to perform each process in each of the plurality of transactions; a specifying unit for specifying a requested provider based on the first history information in response to a request for re-execution of a specific transaction out of the plurality of transactions, the requested provider having been requested to perform, and having performed, each process in each of transactions after the specific transaction; and a cancellation instruction unit for instructing the requested provider which is specified by the specifying unit, to cancel the requested processes in all the transactions executed after the specific transaction. Moreover, in the apparatus, each of the plurality of providers comprises: a second storage for storing therein second history information showing a status before performing a new cycle of the process in a corresponding one of the transactions in response to the request of the requester; and a cancellation unit for cancelling the process in the corresponding one of the transactions based on the second information in response to the cancellation instruction from the cancellation instruction unit, the transactions having been executed in response to other requests of the requester after the specific transaction.

In addition, in the apparatus, the first storage may be one which stores the first history information on each of the plurality of transactions in association with first identification information for identifying the each of the transactions and second identification information for identifying a transaction executed before or after the each of the transactions, and the specifying unit may be one which specifies a transaction executed after the specific transaction, based on the first and second identification information. In this case, the requester may further include: an acquisition unit for acquiring third identification information for identifying a first transaction out of the plurality of transactions; and a transmitter for transmitting, to the requested provider, a request for the process in the first transaction together with the third identification information. Moreover, each of the plurality of providers may further include: a receiver for receiving, from the requester, the request for the process together with the third identification information; and a processor. The processor is for: storing fourth identification information for identifying a second transaction in association with the process in the second transaction to be executed; performing the process in the first transaction when information that the process in the second transaction has been completed is stored in association with the fourth identification information; storing the third identification information in association with the process in the first transaction; and upon completion of the process in the first transaction, storing information that the process in the first transaction has been completed, in association with the third identification information.

Moreover, in the apparatus, the first storage may be one which stores therein the first history information on each of the plurality of transactions in association with identification information identifying the each of the transactions and the order of the each of the transactions, and the specifying unit may be one which specifies the transactions executed after the specific transaction, based on the identification information.

Furthermore, in the apparatus, the requester may further include a re-execution instruction unit for instructing all the requested providers specified by the specifying unit to re-execute all the processes of the transactions executed after the specific transaction. Moreover, in the apparatus, each of the plurality of providers may further include a re-execution unit for re-executing the process in the corresponding one of the transactions executed after the specific transaction, upon receipt of the re-execution instruction from the re-execution instruction unit, without changing an order relation between the process executed in response to the request for the corresponding transaction and other processes executed in response to other requests different from the request. In this case, the second storage may be one which stores therein the second history information on each of the plurality of transactions in association with first identification information for identifying the each of the transactions and with second identification information for identifying a transaction executed before or after the each of the transactions, and the re-execution unit may be one which specifies, based on the first and second identification information, the order relation between the process executed in response to the request for the corresponding transaction and the other processes executed in response to the other requests different from the request. Additionally, the second storage may be one which stores therein the second history information on each of the plurality of transactions in association with identification information identifying the each of the transactions and the order of the each of the transactions, and the re-execution unit may be one which specifies, based on the identification information, the order relation between the process executed in response to the request for the corresponding transaction and the other processes executed in response to the other requests different from the request. Moreover, the process may be a process which updates a database held by each of the plurality of providers, and the second history information may include an image of the database before an update.

Furthermore, the present invention is a method for controlling the execution of a plurality of transactions in each of which one or more processes provided by one or more providers are performed in response to a request of a requester. The requester stores therein first history information showing a provider requested to perform each process in each of the plurality of transactions, and each of the plurality of providers stores therein second history information showing a status before performing the process in a corresponding one of the transactions in response to the request of the requester. The method includes the steps of: in response to a request for re-execution of a specific transaction out of the plurality of transactions, causing the requester to specify, based on the first history information, a provider which has been requested to perform, and has performed, each process in each of transactions after the specific transaction; causing the requester to instruct all the requested providers specified to cancel the processes in all the transactions executed after the specific transaction; and upon receipt of the cancellation instruction, causing each of the plurality of providers to cancel, based on the second history information, the process, which has been performed in response to the request of the requester, in a corresponding one of the transactions executed after the specific transaction.

In addition, the present invention is a program for causing a computer to function as an apparatus for controlling a plurality of transactions in each of which one or more processes provided by one or more providers are performed in response to a request of a requester. The program causes the computer to function as: a storage for storing therein history information showing a provider requested to perform each process in each of the plurality of transactions; a specifying unit for specifying a requested provider based on the first history information in response to a request for re-execution of a specific transaction out of the plurality of transactions, the requested provider having been requested to perform, and having performed, each process in each of transactions after the specific transaction; and a cancellation instruction unit for instructing the requested provider which is specified by the specifying unit, to cancel the requested process in each of the transactions executed after the specific transaction.

The present invention is an apparatus for controlling the execution of a plurality of transactions in each of which one or more processes provided by one or more providers are performed in response to a request of a requester. In the apparatus, the requester includes: a first history information storage for storing therein history information including a first transaction ID of each of the plurality of transactions, a second transaction ID of a transaction executed immediately before each of the transactions, and a provider ID of a provider which has been requested to perform a process in each transaction; a first management information storage for storing therein management information for managing a latest transaction ID of a latest transaction; a specifying unit for specifying a provider ID of a requested provider in response to a request for re-execution of a specific transaction out of the plurality of transactions, the requested provider having been requested to perform, and having performed, each process in each of transactions after the specific transaction, the provider ID being specified by tracing history information from history information including the latest transaction ID as the first transaction ID, to history information including a transaction ID of the specific transaction as the first transaction ID, through history information including the second transaction ID as the first transaction ID; a cancellation instruction unit for instructing all the providers with the provider IDs specified by the specifying unit to cancel the requested processes in all the transactions executed after the specific transaction; and a re-execution instruction unit for instructing all the providers with the provider IDs specified by the specifying unit to re-execute the requested processes in all the transactions executed after the specific transaction. In the apparatus, each of the plurality of providers include: a second history information storage for storing therein history information including a first log ID of a log of a process, which has been performed in response to the request of the requester, in a corresponding one of the plurality of transactions, a second log ID of a log of a process immediately before the process, a third transaction ID of a transaction in which the process is performed, and status information showing a status before performing the process; a second management information storage for storing therein management information for managing a latest log ID of a latest log; a cancellation unit for cancelling, by use of the status information, the process in the corresponding one of the transactions in response to the cancellation instruction from the cancellation instruction unit, the transactions having been executed in response to other requests of the requester after the specific transaction, and the process being canceled by tracing history information from history information including the latest log ID as the first log ID, to history information including a transaction ID of the specific transaction as the third transaction ID through history information including the second log ID as the first log ID; and a re-execution unit for, upon receipt of the re-execution instruction from the re-execution instruction unit, re-executing the process with a certain transaction ID in the corresponding one of the transactions executed in response to a certain request from the requester after the specific transaction, after e-executing a process which has been performed with an older transaction ID than the certain transaction ID in response to a request different from the certain request.

BRIEF DESCRIPTION OF THE DRAWINGS

For a more complete understanding of the present invention and the advantage thereof, reference is now made to the following description taken in conjunction with the accompanying drawings.

FIGS. 5A and 5B are views for explaining an example of processing an insurance policy, used in an embodiment of the present invention.

DETAILED DESCRIPTION OF THE PREFERRED EMBODIMENT

Figure 1:
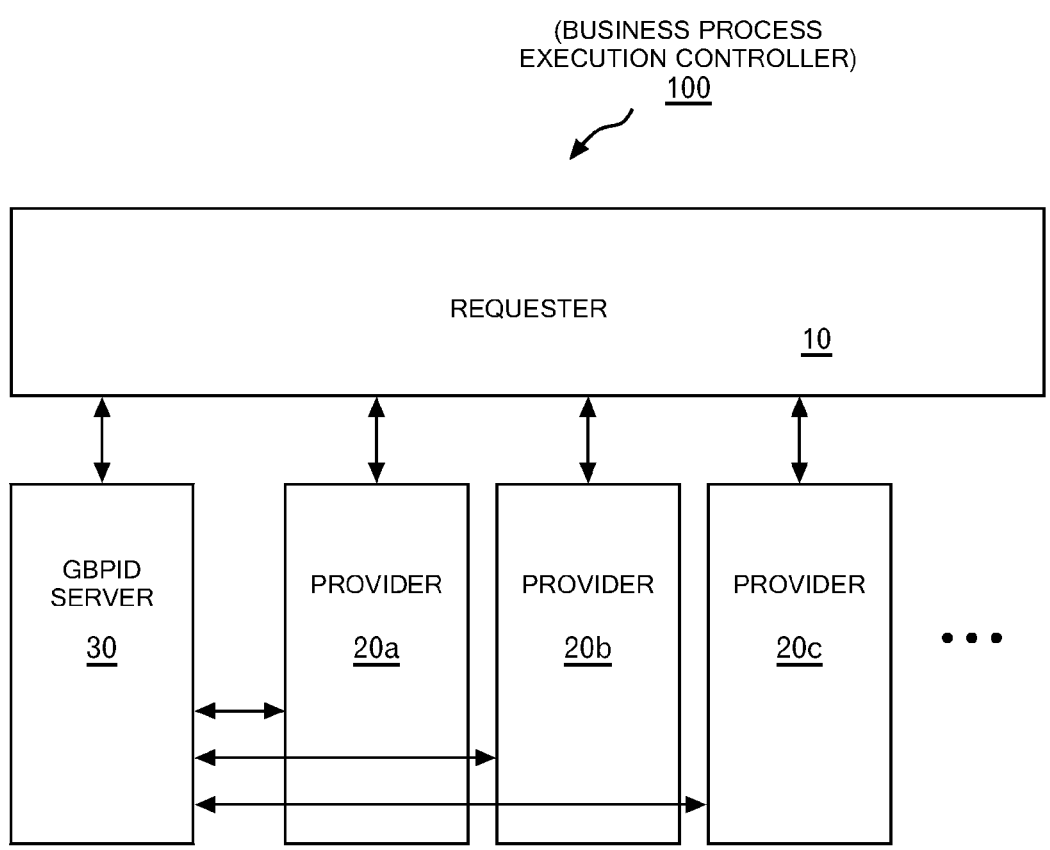
FIG. 1 is a view showing a schematic configuration of a business process execution controller according to an embodiment of the present invention.

A detailed description will hereunder be given of one or more preferred embodiments of, and the best mode for, the present invention with reference to the attached drawings.

In an embodiment of the invention, considered is a business process application executed by a computer system, which is an example of a computer system implemented transaction. The transaction includes processes provided by a combination of a plurality of web services, including update of a DB. When such an application has atomicity, all web services need to be put in the scope of two-phase commit (2PC). Here, the term "atomicity," as well known to those skilled in the art, indicates that either all DB updates are executed successfully or are lost, which may include updates performed by a plurality of independent web services each provided by an independent provider server system. If a failure occurs in a subsequent web service, such that the DB update cannot be completed, all DB updates already executed by the preceding web services must be cancelled. However, in a mission-critical administration system where high reliability is expected, the 2PC mode is not generally adopted due to the following reasons.

1) A requester does not generally have a DB that supports high reliability and integrity. By contrast, providers generally have DB's that support high availability and permanent integrity. Consequently, the requester can implement only a system design and a system operation with relatively low reliability and availability. Adopting 2PC limits the total system to the level of availability that is the "lowest" among the systems of the requester and providers. In other words, if a certain system causes a slowdown due to low reliability (thereby significantly delaying processing time for a business process), the effect will ripple through all other requesters and providers. For example, significant delay in unlocking a DB record may be caused in all systems, causes thereby causing all business processes to wait for the unlocking. In addition, a slowdown caused by a provider has a further ripple effect on all requesters requesting the services of the provider. Adopting a 2PC design, which has such a potential risk to compromise reliability and availability, cannot be easily accepted by providers, since providers must guarantee high reliability to requesters.

2) In 2PC, each provider cannot unlock updated DB records until all of their web services in the scope are completed, so that each provider has to keep holding the lock until the updated DB records are committed. Accordingly, in general, a time for holding the lock is long, thereby causing deadlocks easily. A DB management system (DBMS) generally has a mechanism for detecting deadlocks, so as to detect the occurrence of deadlocks promptly. Slowdown in the entire system is prevented by bringing forced abnormal termination to one of the lock holders. However, deadlocks occurring between mutually independent provider systems cannot be detected since each system has its own DBMS. Therefore, an upper limit (a time-out value) of the lock holding time is set to bring forced termination, as a time-out, to a web service which holds a lock beyond the upper limit. However, in a system having a business process of the 2PC mode which has a wide scope, processing time for another provider needs to be taken in consideration, so that it is very difficult to set an appropriate time-out value. Accordingly, in reality, it is forced to set a very large time-out value. As a result, the deadlock is left for a long time. This is bad because even a single deadlock can be a threat of causing a slowdown in the entire system.

In order to solve such a problem, an embodiment of the invention has the following configuration.

FIG. 1 is a block diagram showing a configuration of a business process execution controller 100 according to an embodiment of the invention. The business process execution controller 100 includes a requester 10, providers 20a, 20b, 20c, and a GBPID server 30.

Among these, the requester 10 receives a request for a business process from an end user and fulfills the request with a combination of a plurality of web services. The requester 10 corresponds to a so-called front-end server, and is a "service requester" in a service-oriented architecture (SOA).

The providers 20a, 20b, 20c, . . . execute the web services in response to the request of the requester 10. The providers 20a, 20b, 20c, . . . correspond to one or more so-called back-end server and are "service providers" in SOA. (Note that when there is no need to distinguish between the providers in the following description, the providers 20a, 20b, 20c, . . . are expressed as a provider 20. Furthermore, although three providers 20 are shown in the drawing, the number of providers 20 is not limited to three.)

The GBPID server 30 performs processes related to a global business process ID (GBPID) being identification information, the ID being numbered at every request of a business process. The GBPID server 30 is connected to all of the requester 10 and the providers 20 to process the request. Here, it is assumed that the numbering of the GBPIDs is performed in ascending order. For example, the use of a time stamp is possible. However, strictly speaking, it does not have to be the ascending order as long as it is unique among all the plurality of requester 10 and providers 20. Note that the GBPID server 30 should desirably be implemented by a general server computer.

Next, description will be given of general operations of business process execution controller 100 according to an embodiment of the invention. Note that, here, the description will be given taking an example of a life insurance business process.

Figure 2:
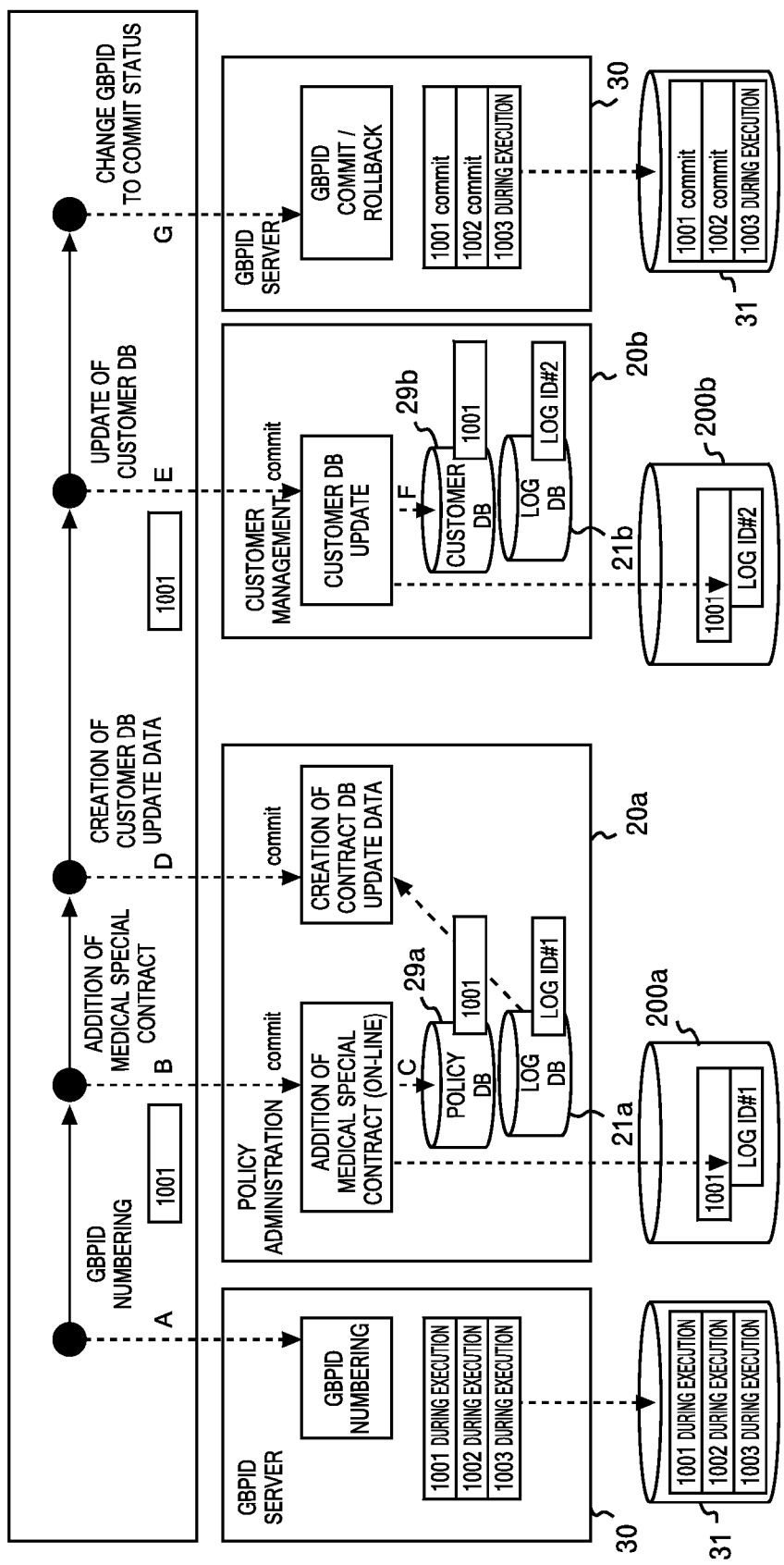
FIG. 2 is a view showing general operations at the time of executing business processes in the business process execution controller according to an embodiment of the present invention.

FIG. 2 is a view for explaining general operations of business process execution controller 100. In the drawing, processes to be performed by requester 10 are shown in requester 10 from left to right in chronological order. Shown below the processes are providers 20 and GBPID server 30, each of which performs a service corresponding to each of the above processes. Therefore, although two GBPID servers 30 are shown, they are the same GBPID server 30. Multiple GBPID servers 30 are shown in the drawing simply because each of them is performing a process of different contents. Also provider 20a for managing policies and the provider 20b for managing customers are shown.

Additionally, FIG. 2 also shows components not shown in FIG. 1, so description thereof will be given below.

Firstly, provider 20a has a log DB 21a and a policy DB 29a. Furthermore, provider 20a also has an ID corresponding DB 200a although it is shown out of the frame of provider 20a for the convenience of creating the drawing. Log DB 21a holds an image of the DB before an update to use the image for, for example, an update cancellation process to be described later. Policy DB 29a is an example of an application DB, and holds data related to policies. ID corresponding DB 200a manages a log ID of a "before-update DB log" and its corresponding GBPID. On the other hand, provider 20b has a log DB 21b and a customer DB 29b. Provider 20b also has an ID corresponding DB 200b, although it is shown out of the frame of provider 20b for the convenience of creating the drawing. Log DB 21b, like log DB 21a, holds an image of the DB before an update to use the image for, for example, an update cancellation process to be described later. Customer DB 29b is an example of an application DB, and holds data related to customers. ID corresponding DB 200b manages a log ID of a "before-update DB log" and its corresponding GBPID. Note that, although log DBs 21a and 21b and ID corresponding DBs 200a and 200b are shown in the drawing, respectively corresponding to providers 20a and 20b, when there is no need to distinguish between log DBs in the following description, they are expressed as log DB 21 and ID corresponding DB 200.

Next, GBPID server 30 has a synchronization point management DB 31 although it is shown out of the frame for the convenience of creating the drawing. Synchronization point management DB 31 is a DB for handling a plurality of DB updates in the same business process as one "business process synchronization point". A GBPID is used to identify a "business process synchronization point". In other words, GBPID server 30 manages a COMMIT/ROLLBACK status not for each DB record but for each GBPID.

Assuming that providers 20a and 20b and GBPID server 30 have these DBs, the following general operations are performed in an embodiment of the invention. Firstly, requester 10 obtains a GBPID from GBPID server 30 (A). GBPID server 30 has numbered GBPIDs "1001", "1002" and "1003" in the drawing, and these GBPIDs are stored in synchronization point management DB 31 along with a status of "DURING EXECUTION". Note that in the step A, of these GBPIDs, GBPID "1001" is assumed to be obtained.

Next, requester 10 requests providers 20 to perform respective web services. At this time, the GBPID to be used for the execution of the web service is informed to providers 20.

In response to this, for each DB update, providers 20 embed the GBPID, for example, at the head of a DB record, so as to show that the business process having the GBPID is either "executing update" of the DB record, "rolling back the update," or "the update is already-committed." Which of these three statuses is set for the DB record is stored in the synchronization point management DB 31. Note that, in this case, when it is assumed that a plurality of web services having the same GBPID in the same business process are processed in parallel on the flow in providers 20, a process order of the plurality of web services in the same business process need to be managed accurately by embedding IDs unique to the respective web services instead of the GBPID. Here, the IDs are created by adding, after the GBPID, branch numbers of the same GBPID. In the following description, as long as confusion does not particularly arise, the ID composed of the combination of the GBPID and the branch number is simply expressed as the GBPID.

Note that the DB records having a GBPID with a state of "DURING EXECUTION" or "ROLLBACK" are not used. In other words, the DB record is not used unless the business process is committed. Whether or not the DB record is committed can be found out by referring to synchronization point management DB 31. When the status of the GBPID embedded in the DB record to be updated is "DURING EXECUTION" or "ROLLBACK", following methods can be employed to prevent deadlocks caused by waiting the DB record to be committed. One method is to return a time-out after a lapse of a fixed period of time, and another method is to bring abnormal termination to a transaction immediately, as if a deadlock is detected by DBMS.

In addition, each provider 20 writes, in log DB 21, an image of the DB record before an update so that all DB updates executed by processing web services can be canceled even after a commit.

In the example of the drawing, the following three web services are requested.

In the first request, requester 10 requests provider 20a to add a hospitalization rider. At this time, GBPID "1001" is also communicated to provider 20a (B). The provider 20a then embeds GBPID "1001" into a record in policy DB 29a, and writes, in the log DB 21a, an image of the DB record before an update as a log datum with a log ID#1 (C). Note that the correspondence between GBPID "1001" and log ID#1 is stored in ID corresponding DB 200a. Upon successful completion of all processes, provider 20a commits the service and unlocks all the DB records.

In the second request, requester 10 requests provider 20a to create the input message to update a customer DB. At this time, GBPID "1001" is also informed to provider 20a (D). Provider 20a then identifies the log ID#1 that corresponds to GBPID "1001" from ID corresponding DB 200a, and creates the customer DB update data on the basis of the log datum with the log ID#1 in log DB 21a. The customer DB update data is then returned to requester 10. Upon successful completion of all processes, provider 20a commits the service and unlocks all the DB records.

In the third request, requester 10 requests provider 20b to update the customer DB. At this time, GBPID "1001" is also communicated to the provider 20b (E). The provider 20b then embeds GBPID "1001" into a record in policy DB 29b, and writes, in log DB 21b, an image of the DB record before an update, as a log datum with a log ID#2 (F). Note that the correspondence between GBPID "1001" and log ID#2 is stored in ID corresponding DB 200b. Upon the successful completion of all processes, provider 20b commits the service and unlocks all the DB records.

Requester 10 instructs GBPID server 30 to put the GBPID in a "COMMIT" status upon the judgment that all the web services have successfully been completed and that the business process can therefore be completed (G). In the drawing, another GBPID "1002" is already stored in synchronization point management DB 31 with a status "COMMIT" assigned thereto. GBPID "1001" assigned with a "COMMIT" status is also stored in synchronization point management DB 31 at this time.

Incidentally, in an embodiment of the invention, as described above, each provider 20 should always check the status of the GBPID upon reference and update of the DB record in order not to perform a reference or update process on a DB record having a GBPID not in the "COMMIT" status. In this manner, the check of the GBPID basically needs to be performed for every access to the DB record. However, if synchronization point management DB 31 is referenced for every access to the DB record, the performance slows down.

To address the above problem, the following configuration is also adoptable in an embodiment of the invention.

Figure 3:
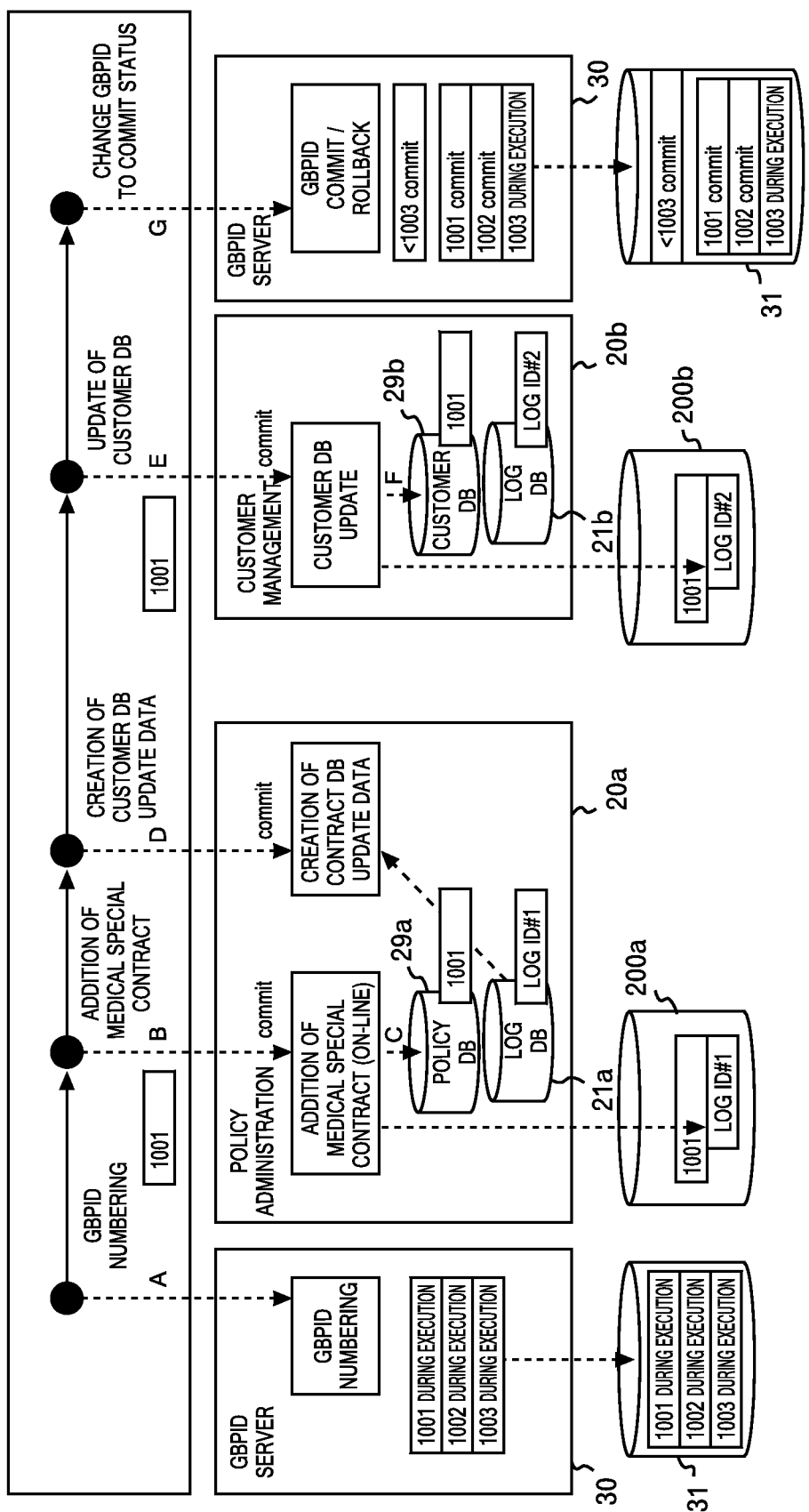
FIG. 3 is another view showing general operations at the time of executing business processes in the business process execution controller according to an embodiment of the present invention.

FIG. 3 is a view for explaining a modification example of the general operations of the business process execution controller 100.

In the drawing, when the status of GBPID "1001" changes to "COMMIT" in addition to GBPID "1002" upon the instruction, in the step G, of requester 10 to GBPID server 30, the information that "below 1003 is already committed" is stored in synchronization point DB 31. Note that this is shown as "<1003 COMMIT" for simplification in the drawing.

Therefore, each provider 20 can hold, on a memory, an oldest pending GBPID (OPGID) being the smallest GBPID in the status "DURING EXECUTION". If the GBPID is smaller than the OPGID, then it can be judged that the GBPID is already committed. Hence, only when the GBPID is greater than the OPGID, synchronization point DB 31 is referred to so as to judge whether the GBPID is already committed or not.

On the other hand, assume that some failure occurred while executing a web service. In this case, rollback is performed. Description will be given of general operations performed at this time.

Figure 4:
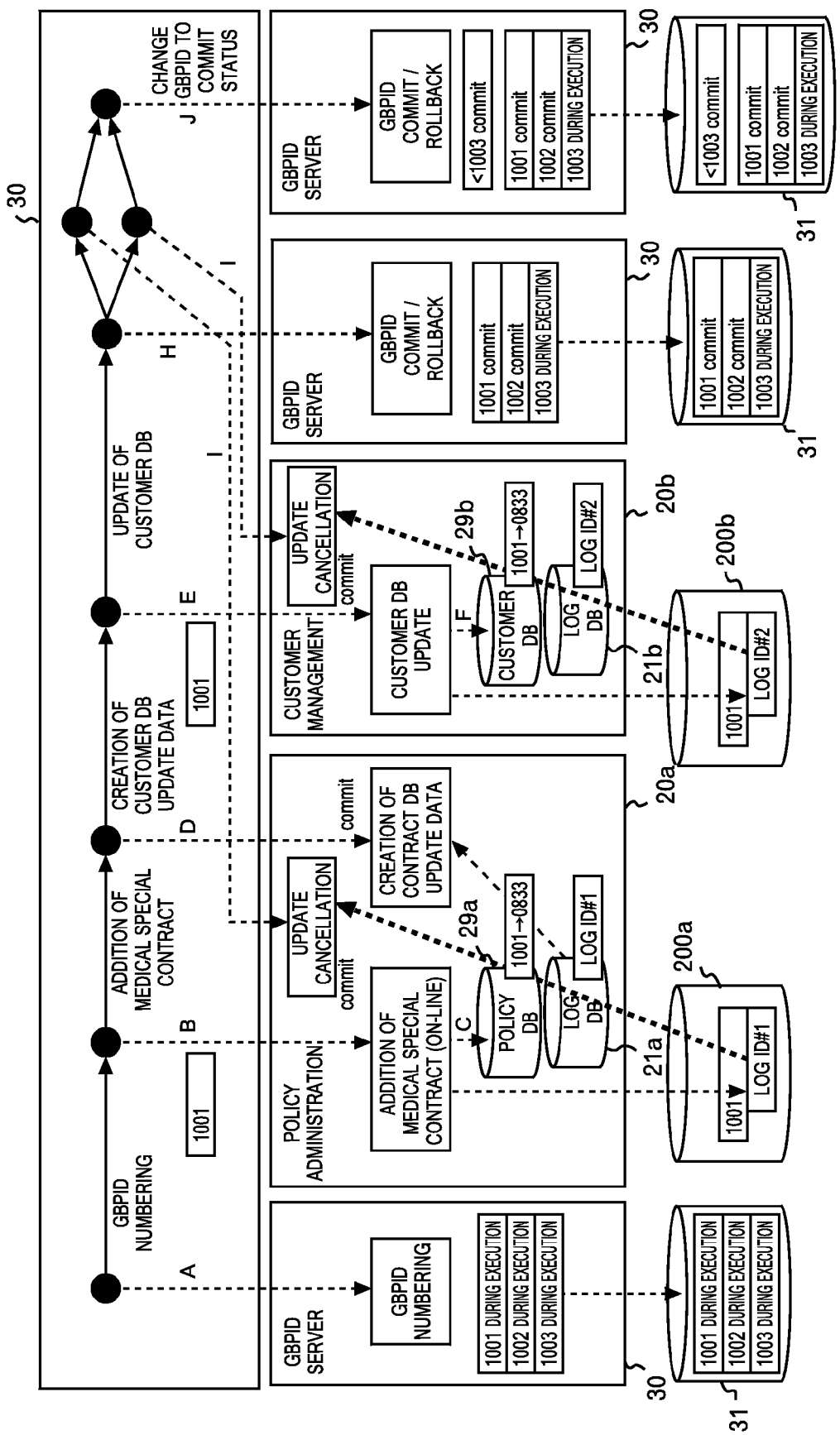
FIG. 4 is another view showing general operations at the time of executing business processes in the business process execution controller according to an embodiment of the present invention.

FIG. 4 is a view for explaining general operations upon rollback in business process execution controller 100 according to an embodiment of the invention. Note that although three GBPID servers 30 are shown in the drawing, in this embodiment they are the same one GBPID server 30, as is similar to the case in FIG. 2.

In the drawing, the steps A to F are the same as those described in FIG. 2. However, in the drawing, it is assumed that a failure has occurred when customer DB 29b was being updated in the step F. Upon the occurrence of the failure, provider 20 performs the rollback process and releases the lock as well as informs requester 10 that the service was not executed. Upon being informed of the failure, requester 10 instructs GBPID server 30 to put the relevant GBPID in the "ROLLBACK" status (H). In the drawing, the GBPID "1001" assigned with the "ROLLBACK" status is stored in synchronization point DB 31.

Afterwards, requester 10 starts an update cancellation process so as to cancel the DB update for all web services which have already been completed (I). At the request for the update cancellation, each provider 20 restores the old DB record by using some method for updating the DB with the image of the DB record before the update stored in the log DB 21. In this particular case that is illustrated, when finding a GBPID with the "ROLLBACK" status, each provider 20 restores the old DB record by itself by use of log DB 21 and continues the processing. Specifically, provider 20 obtains a necessary log ID from the ID corresponding DB 200 and replaces the record with a before-update DB image corresponding to the log ID. At this point, assuming the update cancellation where different services with the same GBPID update the same record, it is required to restore the old DB record by use of the log in the opposite order of the log ID (the descending order of "the GBPID+the branch number"). With this, the GBPID on the DB record is restored to a previous old GBPID. In the drawing, providers 20a and 20b are instructed to cancel the updates, and GBPID "1001" is caused to be restored to an old GBPID "0833". Upon completion of the update cancellation in all the providers 20, requester 10 instructs GBPID server 30 to put the relevant GBPID in the "COMMIT" status (J). Immediately after the update cancellation instruction, GBPID "1001" was stored in synchronization point DB 31 with the status "ROLLBACK" assigned thereto, but after the completion of the update cancellation, GBPID "1001" is now stored in synchronization point DB 31 with the status "COMMIT" assigned thereto.

As described above, in an embodiment of the invention, COMMIT/ROLLBACK by the DBMS is executed immediately after the processing of a service is terminated, and the lock is released. Therefore, unlike the case of 2PC, a lock holding time is not delayed by being dragged by other requester 10 and providers 20, so that the problem described at the beginning does not occur.

In addition, it is guaranteed that a committed DB record is not referred to or updated unless the status information, which is managed for each GBPID, is put in the "COMMIT" status. Hence, an update cancellation process can always be performed by use of a log of a DB before an update, and it is possible to achieve the atomicity of global data of an entire business process.

Moreover, it is possible to simplify the mechanism since COMMIT/ROLLBACK is managed not for each DB record or web service but for each GBPID which includes the DB record updates and the web services.

Furthermore, the statuses of the GBPIDs are collectively managed by GBPID server 30 independently of requester 10 and providers 20. Accordingly, a new dependency will not arise between requester 10 and providers 20, so that it is possible to achieve the atomicity of complex global data only with the implementation closed in each system. Specifically, even if the numbers of requesters 10 and providers 20 increase or if providers 20 belong to a plurality of companies, no change is needed for the implementation as long as GBPID server 30 is shared. Moreover, if the reliability of GBPID server 30 is sufficiently high, the reliability of requesters 10 and providers 20 will not fall.

Note that numbering of a GBPID may be implemented as a web service provided by a specific provider 20. The easiest method of numbering a GBPID is to return a time stamp of provider 20 as a GBPID. However, when the same time stamp value is generated, it is necessary to modify the numbering method by, for example, adding a different branch number to the time stamp value, in order to guarantee the uniqueness of a GBPID. In addition, when the numbering is required many times, the parallel processing of web services needs to be considered. In this case, it is possible to avoid the duplication of GBPIDs among the numbering processes performed in parallel, by adding numbering process IDs unique to each numbering process, so that the GBPID is a combination of the time stamp value, the branch number, and the numbering process ID. By adding the numbering process ID in this manner, the reverse of GBPIDs may occur among the business processes occurring during an extremely short period of time. However, in this embodiment, a failure does not occur due to the reverse in such a degree.

Incidentally, in the above-mentioned application which implements one business process with a combination of web services including a plurality of DB updates, it has been difficult to implement UNDO/REDO because of the following problems.

1) In reality, one business process is implemented by a plurality of providers, which are independent of a requester and carry out services including DB updates. Each provider executes services at the requests of a plurality of requesters. Therefore, one requester alone cannot grasp all web services that have updated a certain DB record, for carrying out UNDO/REDO. Moreover, a provider cannot grasp all web services included in one business process or carrying out UNDO/REDO, particularly when the web services are executed by other providers. Consequently, no system can execute UNDO/REDO.

2) A business process targeted for UNDO/REDO has to be undone in the order opposite to the order that the business process was executed, and has to be redone in the same order as the order that the business process was executed. This order has to be accurate. The order of processes is easily grasped when the business process is executed in one system. However, it is not easy when the business process is distributed to a plurality of providers to be executed. For example, a provider executes a service included in a business process A prior to a business process B, but another provider may execute a service included in the business process B prior to the business process A. In this case, no matter which business process order is used to carry out UNDO/REDO, it is not possible to perform UNDO/REDO accurately because the execution order is incorrect in one of the providers.

In order to solve such a problem, the following configuration is provided in an embodiment of the invention.

1) The requester side obtains an execution history of each business process (hereinafter referred to as the "business process history"), and each provider obtains an execution history of each service (hereinafter referred to as the "service history"). Each provider executes UNDO on the basis of the service history. Additionally, the requester sequentially conducts REDO for the business processes on the basis of the business process history. When the business processes are redone, each provider is requested to REDO each service. Each provider refers to the service history before redoing the requested service. If there are any services executed at the request of other requesters prior to the requested service, the providers execute REDO for those services, and then execute the service that has just been requested. With such a design, it is possible to carry out UNDO/REDO with the compatibility among all the requesters and providers in cooperation between the requesters and the providers.

2) As described above, all the requesters assign a GBPID to each request for a business process, and inform each provider of the GBPID used for a service execution. The GBPID assigned here is one of the GBPIDs that exist in the ascending order over the providers. Each provider embeds the GBPID in a DB record for every DB update. Upon successful completion of the business process, the requesters put the relevant GBPID in the "COMMIT" status. Furthermore, each provider always checks the status of the GBPID when referring to or updating a DB record so as not to process a DB record having a GBPID not in the "COMMIT" status. By taking such a mechanism, it is made possible to serialize business processes in which conflict might occur in the DB records of any one of the providers. It is possible to determine a process order where the compatibility between business processes and services to be undone and redone is provided, by creating a reverse chain according to the process order taking the GBPID as a key.

Description will be given of such UNDO/REDO taking an example of a policyholder who has a plurality of insurance policies.

FIG. 5A is a view schematically showing such an example according to an embodiment of the invention. Note that it is assumed in the example that UNDO/REDO is performed for each policyholder and that customer IDs are keys for UNDO/REDO. Incidentally, in the drawing, a symbol c# represents the customer ID of each policyholder. Moreover, symbols p#1 to p#4 represent the policy numbers of insurances, respectively. For example, p#1 indicates a policy number of a permanent life insurance of the policyholder, and p#2 indicates a policy number of a medical insurance of the policyholder.

In addition, FIG. 5B shows an example of business processes related to the insurance policy according to an embodiment of the invention.

As illustrated, a change in a permanent life insurance is made in a process Ax, an input message is created from log data in a process Bx, and a customer DB is updated in a process Cz. Furthermore, a change in a medical insurance is made in a process Dx, an input message is created from the log data in a process Ex, and the customer DB is updated in a process Fz. Additionally, a change in an accident insurance is made in a process Gy, an input message is created from the log data in a process Hy, and the customer DB is updated in a process Iz. Note that the second letter of the symbol representing each process indicates the provider 20 providing the process. Specifically, A, B, D, and E are web services provided by the provider 20x, G and H are web services provided by the provider 20y, and C, F, and I are web services provided by the provider 20z. In other words, the provider 20x processes the permanent life insurance and the medical insurance, the provider 20y processes the accident insurance, and the provider 20z processes the customer management.

Note that it is assumed in this example that the contents of the input messages used to update the customer DB are different from each other, depending on the results of each contract process. For this reason, the input message is created using the log data. Here, the log data is data stored in the above-mentioned log DB 21. Although the detail will be described later, stored in log DB 21 are log data related to a transaction, such as input/output messages and the images of the application DB before and after an update. It is assumed that the use of the log data makes it possible to restore the input/output messages or to undo the DB update.

Furthermore, in the drawing, the customer DB is an example of a DB which sets a customer ID as a key. Note that a customer DB update transaction needs to be divided by each policy in order to perform UNDO/REDO on each policy.

Next, description will be given of general operations of UNDO/REDO in the business process shown in FIG. 5.

Figure 6:
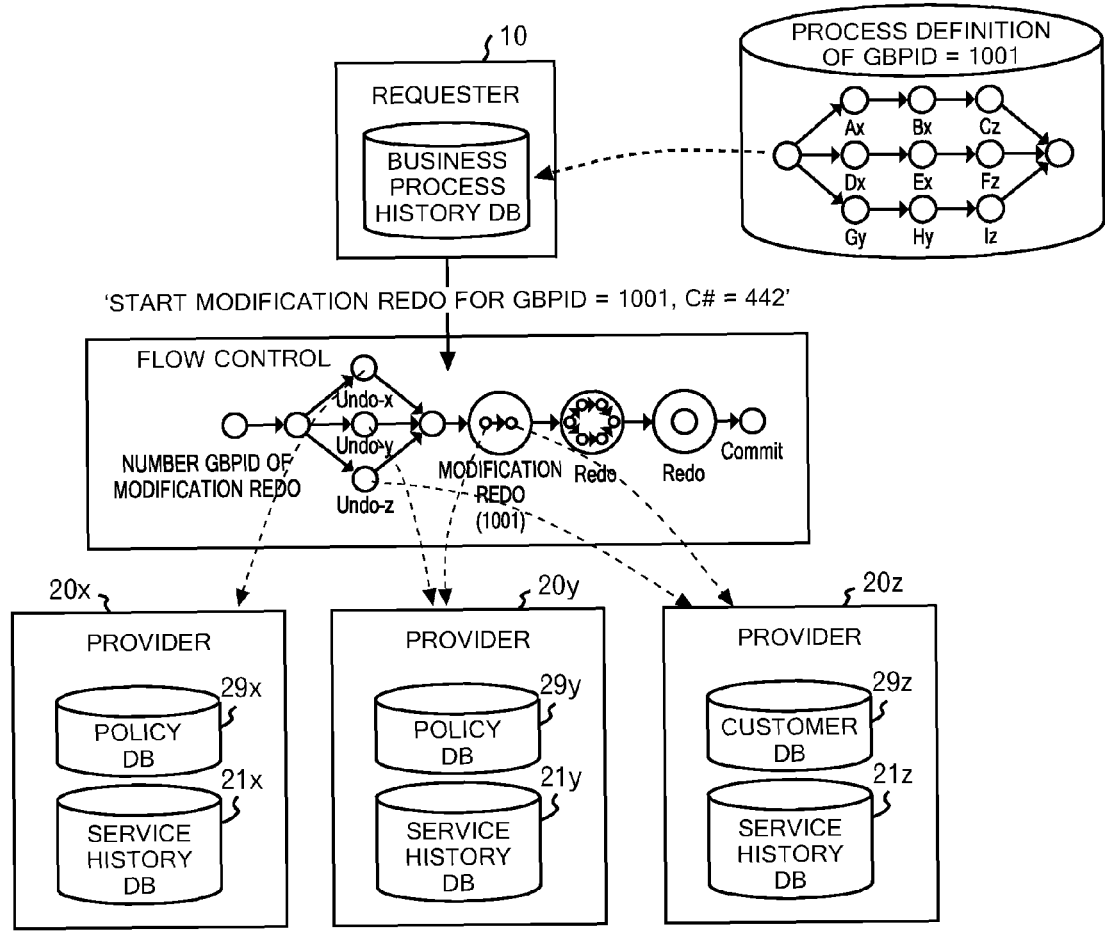
FIG. 6 is a view showing general operations at the time of performing UNDO/REDO in an embodiment of the present invention.

FIG. 6 is a view showing the general operations of UNDO/REDO according to an embodiment of the invention. As illustrated, requester 10 has a business process history DB, and providers 20x, 20y and 20z have service history DBs 21x, 21y and 21z, respectively (the service history DB 21 can be the same as the log DB 21). UNDO/REDO is performed by requester 10's controlling the process flow of UNDO/REDO on the basis of the business process history.

In other words, requester 10 starts a process of modifying and re-executing (or performing modification REDO of) the DB update on GBPID "1001" and a customer ID "442". Therefore, requester 10 instructs providers 20x, 20y and 20z to perform UNDO/REDO in accordance with a flow shown in the frame of the "flow control".

Specifically, as a first step, requester 10 numbers a GBPID of modification REDO.

Next, as a second step, requester 10 requests all related providers 20 to perform UNDO. Here, since the business processes were executed by services performed by providers 20x, 20y and 20z, providers 20x, 20y and 20z are requested to perform UNDO. Note that it is assumed that the services do not implicitly spread over other providers 20. That is, it is assumed that no such situation occurs that, for example, even though a provider 20 had requested another provider 20 for a web service and requested provider 20 performed some DB update, requester 10 does not know that the DB update was performed.

Then, as a third step, requester 10 makes a change in the contents of the insurance change process of GBPID "1001" and performs modification REDO.

Then, as fourth and fifth steps, requester 10 sequentially requests each provider 20 to perform REDO on processes having the GBPID of after "1001".

Moreover, as a sixth step, when all REDO is complete, it is committed.

Here, description will be given of a structure of DBs held by requester 10 according to an embodiment of the invention. Note that in this example, UNDO/REDO is performed per policy and that a policy number is a key for UNDO/REDO.

Figure 7:
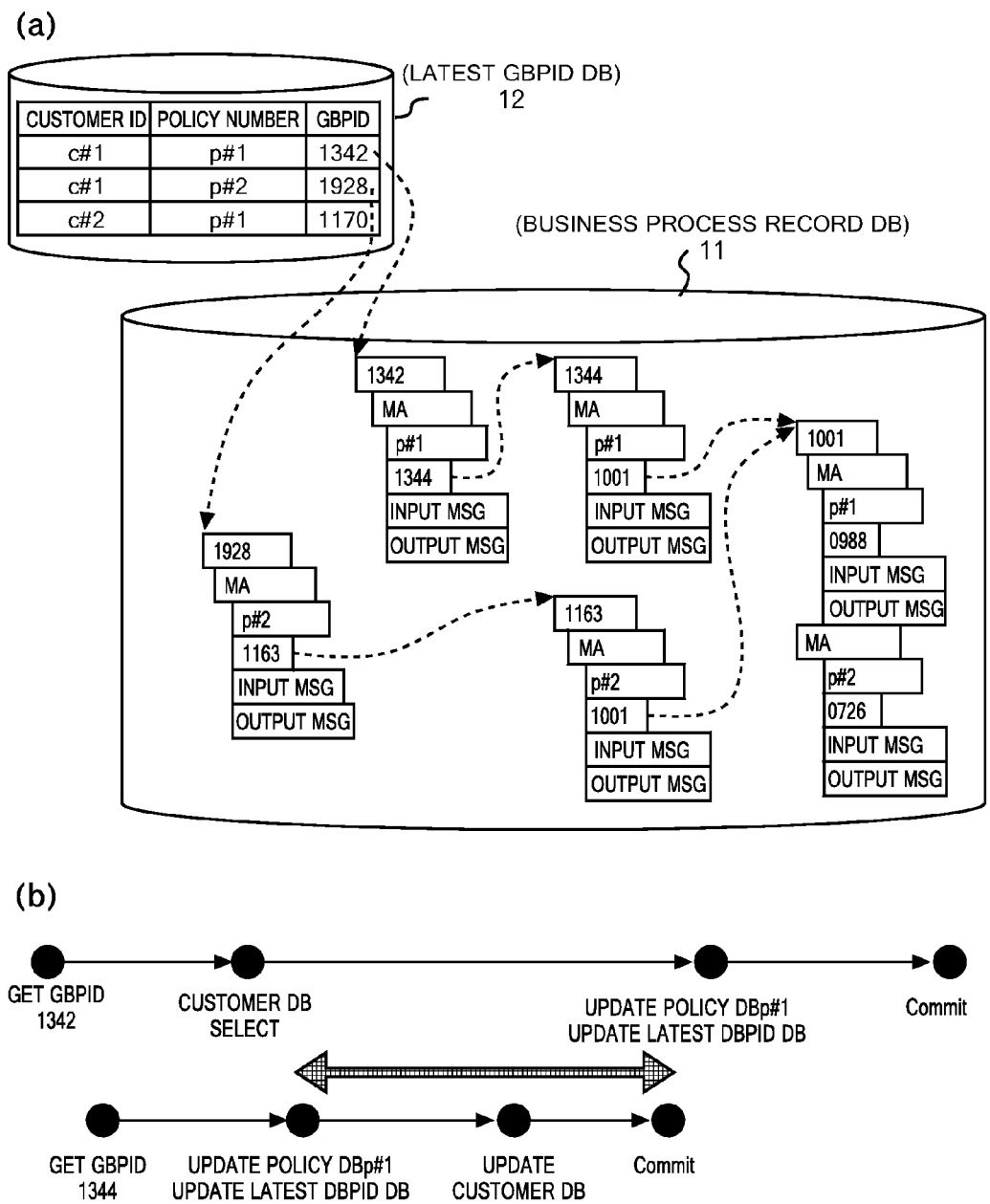
FIGS. 7A and 7B are views showing an example of DBs held by a requester according to an embodiment of the present invention.

FIG. 7A is a view showing structural examples of a business process history DB 11 and a latest GBPID DB 12 according to an embodiment of the invention.

Firstly, latest GBPID DB 12 holds only a last established GBPID, for each set of a customer ID and a policy number. For example, latest GBPID DB 12 records therein information that the last established GBPID for a customer ID "c#1" and policy number "p#1" is a GBPID "1342", and information that the last established GBPID for customer ID "c#1" and policy number "p#2" is a GBPID "1928". In FIG. 6, UNDO/REDO is performed for each customer ID, but in FIG. 7A, UNDO/REDO is performed for each policy number, so that a GBPID is recorded for each set of a customer ID and a policy number.

Incidentally, in the drawing, the same "p#1" is stored as policy numbers of the customer IDs "c#1" and "c#2", but this simply indicates the policy number of a specific type of insurance policy (a permanent life insurance, in this case) and does not mean that their policy numbers themselves are the same.

In addition, business process history DB 11 stores therein a business process history being a record of each execution of a business process. Here, the business process history stores therein an input/output message and the like while taking a GBPID as a key. Note that an input message also includes the identifier (for example, the name of the provider) of provider 20 which has been requested to perform a service. Moreover, the business process history holds a GBPID which performed the previous business process (including DB updates) for the set of a customer ID and a policy number, too. This functions as a backward pointer, which makes it possible to trace all business process histories in reverse order. Note that the previous GBPID of the currently executing GBPID can be obtained from latest GBPID DB 12.

For example, the history record of customer ID "c#1" and policy number "p#1" was last updated by GBPID "1342", and before that, was updated by GBPID "1344", and still before that, was updated by GBPID "1001". In this manner, the process order is guaranteed by a reverse chain from latest GBPID DB 12.

However, like the above-mentioned relation between the GBPID "1342" and the GBPID "1344", GBPIDs may be reversed. In other words, after a certain record is updated by a certain GBPID, it may be updated by a smaller GBPID than the certain GBPID.

FIG. 7B shows a situation at this point.

In the drawing, the upper half shows a life cycle of the GBPID "1342" and the lower half shows a life cycle of the GBPID "1344". In this case, the record of the policy number "p#1" of the policy DB is updated first by the GBPID "1344". Consequently, in the drawing, the above-mentioned exclusive control function of a GBPID guarantees that the record of the policy number "p#1" of the policy DB is not updated during a period shown with the boldface arrow. In other words, after the GBPID "1344" is committed, the record of the policy number "p#1" of the policy DB is updated by the GBPID "1342". Therefore, although the GBPIDs are reversed, the reverse chain shows the correct process order. Note that here each business process history includes the previous GBPID, but can include a following GBPID.

Additionally, description will be given of a structure of DBs held by the provider 20 according to an embodiment of the invention. Note that also in this example, UNDO/REDO is performed per policy and that a policy number is a key for UNDO/REDO. Furthermore, here, it is assumed that a GBPID transferred upon the request of a web service is used as it is as a log ID.

Figure 8:
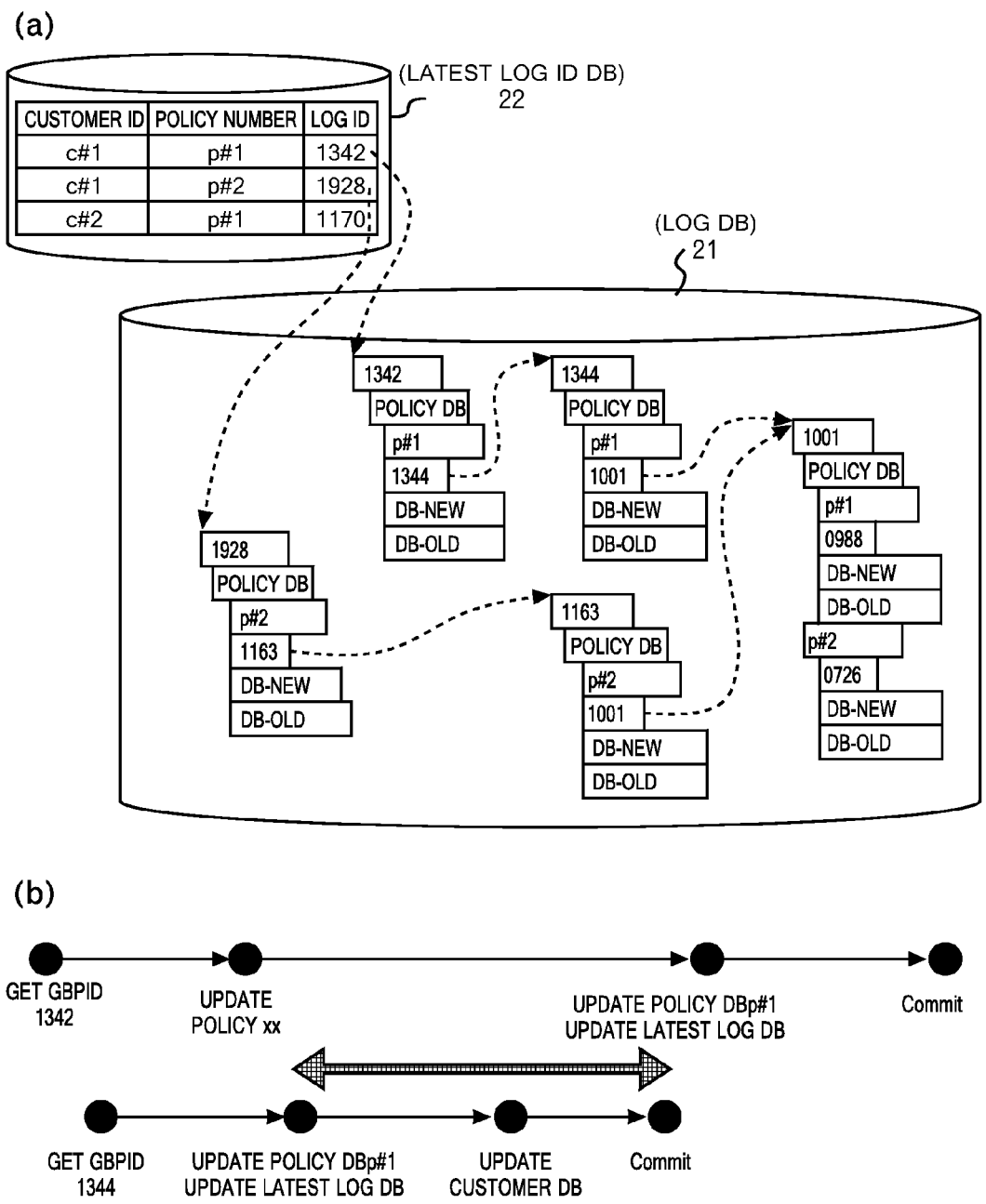
FIGS. 8A and 8B are views showing DBs held by a provider according to an embodiment of the present invention.

FIG. 8A is a view showing structural examples of the log DB 21 and a latest log ID DB 22.

Firstly, the latest log ID DB 22 holds only a last established log ID for each set of a customer ID and a policy number. For example, the latest log ID DB 22 records therein information that the last established GBPID for the customer ID "c#1" and the policy number "p#1" is a log ID "1342", and information that the last established GBPID for the customer ID "c#1" and the policy number "p#2" is a log ID "1928". However, with regard to the customer DB, a last established log ID is stored for each customer ID.

Moreover, the log DB 21 records therein a log datum being a log of each update of the application DB. Here, the log datum stores therein input/output messages, an image of the DB before an update, an image of the DB after an update, and the like while taking a log ID as a key. In addition, the log DB 21 also holds a log ID related to the previous DB update for the set of a customer ID and a policy number. This functions as a backward pointer, which makes it possible to trace all process histories within this provider in reverse order. Note that the previous log ID of the currently executing log ID can be obtained from latest GBPID DB 12.

For example, the history record of the customer ID "c#1" and the policy number "p#1" was last updated by the log ID "1342", and before that, was updated by the log ID "1344", and still before that, was updated by the log ID "1001". In this manner, the process order is guaranteed by the reverse chain from latest GBPID DB 12.

However, like the above-mentioned relation between log ID "1342" and log ID "1344", log IDs may be reversed. In other words, after the update of a certain record is recorded as a log of a certain log ID, it may be recorded as a log datum of a smaller log ID than the certain log ID.

FIG. 8B shows a situation at this point.

In the drawing, the upper half shows a life cycle of GBPID "1342" and the lower half shows a life cycle of GBPID "1344". In this case, the record of policy number "p#1" of the policy DB is updated first by GBPID "1344". Consequently, in the drawing, the above-mentioned exclusive control function of a GBPID guarantees that the record of policy number "p#1" of the policy DB is not updated during a period shown with the boldface arrow. In other words, after GBPID "1344" is committed, the record of policy number "p#1" of the policy DB is updated by the GBPID "1342". Therefore, although the GBPIDs are reversed and consequently the log IDs are also reversed, the reverse chain shows the correct process order. Note that here the log datum includes the previous log ID, but can alternatively include a following log ID.

Incidentally, in the above description, it is assumed that the log ID is determined so that the log ID would be the same as a GBPID when the provider 20 receives the GBPID from requester 10. In this case, the larger a GBPID is, the larger a log ID is. In contrast, another configuration may be taken in which a log ID is numbered upon the update of log DB 21. In this case, a log ID corresponding to GBPID "1342" is larger than a log ID corresponding to GBPID "1344" since the log ID corresponding to GBPID "1342" is numbered after the log ID corresponding to GBPID "1344" is numbered. That is, the log IDs are not reversed. Accordingly, the above description that "the log IDs may be reversed" generally means that "the order of updating log DB 21 may not be the ascending order of GBPIDs". Note that even if a different value is used as a log ID from a GBPID in the above manner, each provider 20 can easily grasp, from log DB 21, the GBPID of a business process where the DB update was performed, since the GBPID is included in an image of the DB before an update.

Additionally, log DB 21 needs to record log data in a case of batch processing as well. However, GBPIDs are not obtained for batch processing. The log data need to include input data for the batch processing instead of input messages so as to perform REDO.

Further detailed description will hereunder be given of the business process execution controller 100 according to an embodiment of the invention. Note that in the following description, a target of UNDO/REDO is called an "object" and that identification information which uniquely identifies an object is called an "object ID". In other words, the policy numbers in FIGS. 7A to 8B are examples of the "object IDs".

Firstly, description will be given of a functional configuration of business process execution controller 100 according to an embodiment of the invention.

Figure 9:
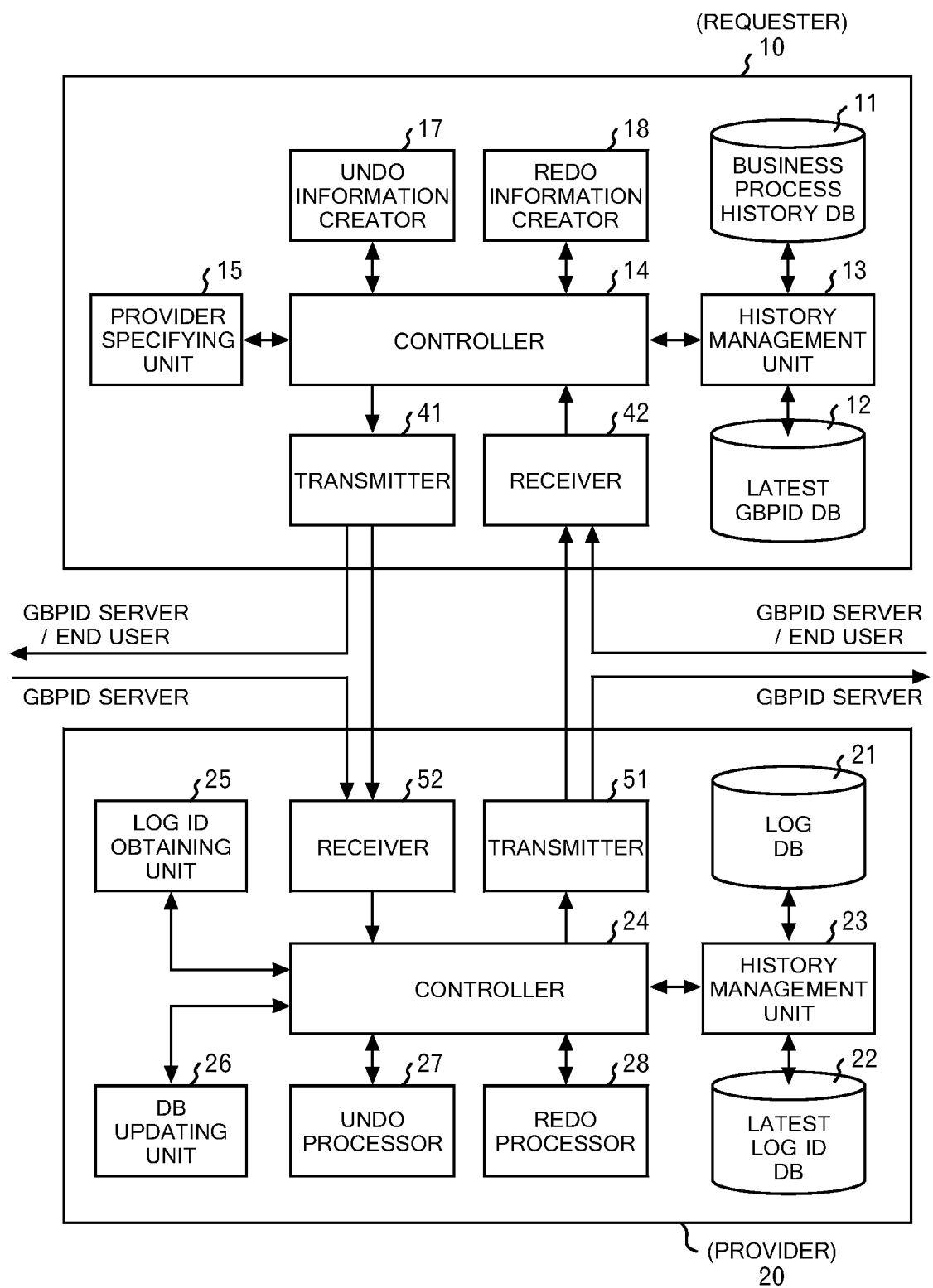
FIG. 9 is a block diagram showing functional configuration examples of a requester and a provider according to an embodiment of the present invention.

FIG. 9 is a block diagram showing functional configuration examples of requester 10 and provider 20.

As illustrated, firstly, requester 10 includes business process history DB 11, latest GBPID DB 12, a history management unit 13, a controller 14, and a provider specification unit 15. Requester 10 further includes an UNDO information creator 17A REDO information creator 18A transmitter 41, and a receiver 42.

Business process history DB 11 is, as described in FIG. 7A, a database which records therein a business process history being a record for each execution of a business process. In an embodiment of the invention, a business process history is used as an example of first history information showing a provider which is requested to perform a process, and business process history DB 11 is provided as an example of a first storage which stores therein the first history information.

Latest GBPID DB 12 is, as described in FIG. 7A, a database which stores therein, for each object, the GBPID of a business process which last updated the object.

History management unit 13 manages business process history DB 11 and latest GBPID DB 12.

Controller 14 controls the entire operation of requester 10.

Provider specification unit 15 specifies, based on a business process definition, the provider which should be requested for a web service when requesting the web service. Moreover, when performing UNDO/REDO, provider specification unit 15 specifies the provider 20 which has been requested to perform the web service, on the basis of a business process history. In an embodiment of the invention, the provider specification unit 15 is provided as an example of a specification unit which specifies a provider which is requested for a process.

UNDO information creator 17 creates information necessary for UNDO. In an embodiment of the invention, UNDO information creator 17 is provided as an example of a cancellation instruction unit which instructs the cancellation of a process.

REDO information creator 18 creates information necessary for REDO. In an embodiment of the invention, REDO information creator 18 is provided as an example of a REDO instruction unit which instructs re-execution of a process.

Transmitter 41 transmits a request for a web service or UNDO/REDO to provider 20. In addition, the transmitter 41 transmits, to GBPID server 30, a request for numbering a GBPID or for changing a status. In an embodiment of the invention, transmitter 41 is provided as an example of a transmitter which transmits a request for a process along with third identification information.

Receiver 42 receives, from providers 20, a notification stating whether the web service has been succeeded or not. In an embodiment of the invention, receiver 42 is provided as an example of an acquisition unit which acquires the third identification information.

Furthermore, provider 20 includes log DB 21, latest log ID DB 22, a history management unit 23, a controller 24, a log ID acquisition unit 25 and a DB updating unit 26. Provider 20 further includes an UNDO processor 27A REDO processor 28A transmitter 51, and a receiver 52.

Log DB 21 is, as described in FIG. 8A, a database which stores therein a log datum being a log of each update of the application DB. In an embodiment of the invention, the log datum is used as an example of second history information showing the status before performing a process, and log DB 21 is provided as an example of a second storage which stores therein the second history information.

Latest log ID DB 22 is, as described in FIG. 8A, a database which records therein, for each object, a log ID of a log datum in which the last update of the object is recorded.

History management unit 23 manages log DB 21 and latest log ID DB 22.

Controller 24 controls the entire operation of the provider 20.

Log ID acquisition unit 25 acquires a log ID being identification information of a log datum in which the update of the application DB is stored.

DB updating unit 26 updates the application DB in response to the request of requester 10 for a web service. At this point, DB updating unit 26 embeds a GBPID in a DB record targeted for an update. In an embodiment of the invention, DB updating unit 26 is provided as an example of a processor which operates as follows. The processor stores therein fourth identification information identifying another transaction, in association with the object of a process, and performs a process when information that the processing of the transaction is complete is stored in association with the fourth identification information. Further, the processor stores therein the third identification information in association with the target of the process, and upon completion of the process, stores therein information that a transaction is complete, in association with the third identification information.

UNDO processor 27 executes UNDO in response to the request of requester 10. In an embodiment of the invention, UNDO processor 27 is provided as an example of a cancellation unit which cancels a process.

REDO processor 28 executes REDO in response to the request of requester 10. In the embodiment, REDO processor 28 is provided as an example of a re-execution unit which re-executes a process.

Transmitter 51 transmits, to requester 10, a result whether or not a web service has successfully been performed. Moreover, transmitter 51 transmits, to GBPID server 30, a message of an inquiry about a GBPID status.

Receiver 52 receives, from requester 10, a request for a web service or for UNDO/REDO. Additionally, receiver 52 receives, from GBPID server 30, the result of the inquiry about the GBPID status. In an embodiment of the invention, receiver 52 is provided as an example of a receiver which receives a request for a process along with the third identification information.

Next, description will be given of the operation of business process execution controller 100 according to an embodiment of the invention. Note that in the following description of the operation, a different value from a GBPID is used as a log ID. Firstly, description will be given of the operation of requester 10 when processing a request for a business process.

Figure 10:
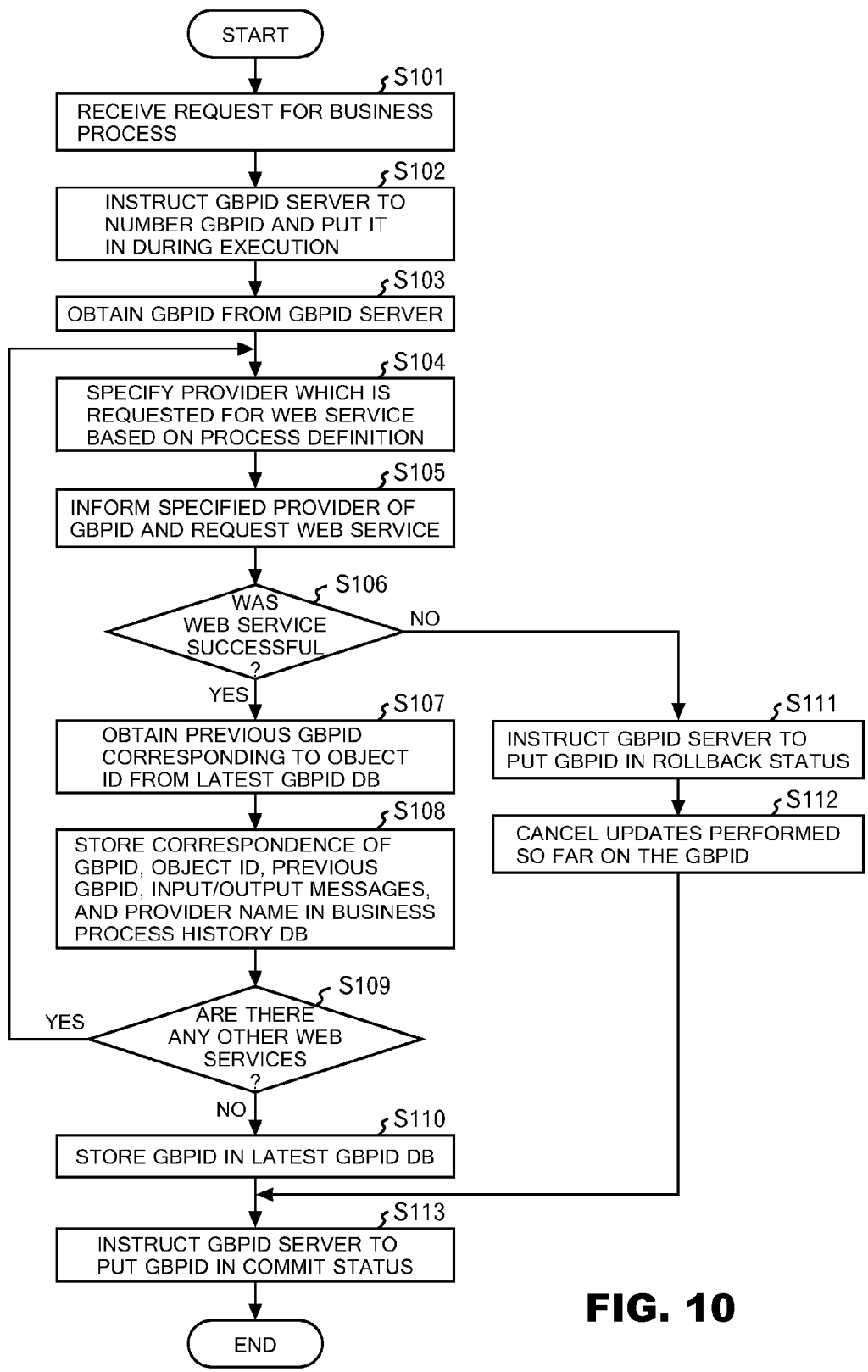
FIG. 10 is a flow chart showing an operational example at the time when a requester executes business processes according to an embodiment of the present invention.

FIG. 10 is a flowchart showing an operational example of requester 10 at this point, according to an embodiment of the invention.

In requester 10, receiver 42 firstly receives a request to execute a business process, which specifies an object ID, from an end user through, for example, an unillustrated HTTP server, and transfers the request to controller 14 (Step 101). Controller 14 then instructs transmitter 41 to transmit a request to obtain a GBPID. Transmitter 41 then transmits, to GBPID server 30, a request to number a GBPID and put its status in "DURING EXECUTION" (Step 102). Upon the request, GBPID server 30 numbers a GBPID and records "DURING EXECUTION" as the status information of the GBPID, in synchronization point management DB 31. On the other hand, receiver 42 receives the GBPID from GBPID server 30 and transfers the GBPID to controller 14 (Step 103).

Next, controller 14 instructs provider specifying unit 15 to specify the provider 20 that has been requested to perform the web service. Provider specifying unit 15 then specifies the provider 20 that has been requested for the web service, on the basis of the business process definition, and transfers the name of the provider to controller 14 (Step 104). Controller 14 then sends, to transmitter 41, the GBPID received from receiver 42, the object ID received from receiver 42 previously, the provider name received from provider specifying unit 15 and the input message being the contents of the request of the web service, and instructs transmitter 41 to transmit the web service request. Transmitter 41 then transmits the web service request including the GBPID, the object ID, and the input message, to provider 20, the provider name of which has been specified (Step 105).

Afterwards, in requester 10, receiver 42 receives the information from provider 20 and transfers the information to controller 14. Controller 14 then judges whether or not the information indicates the success of the web service (Step 106).

Here, if the information indicates the success of the web service, controller 14 instructs history management unit 13 to process business process history DB 11 and latest GBPID DB 12. At this point, controller 14 transfers, to history management unit 13, the GBPID received by receiver 42 in Step 103, the object ID of the target for the web service, the input/output messages exchanged with provider 20, and the provider name obtained by provider specifying unit 15 in Step 104. History management unit 13 then performs the following operations.

Specifically, history management unit 13 first refers to latest GBPID DB 12, and obtains a GBPID associated with the object ID (Step 107). Note that the GBPID obtained in Step 103 will be the latest GBPID, so that the GBPID obtained in Step 107 will be the previous GBPID.

Next, history management unit 13 records, in business process history DB 11, the GBPID transferred from controller 14, the object ID similarly transferred from controller 14, the previous GBPID obtained in Step 107, the input/output messages, the provider name transferred from controller 14 in association with each other (Step 108). The control is then returned to controller 14.

Afterwards, controller 14 judges whether or not there are any more web services to be requested on the basis of the business process definition (Step 109). If it is judged that there are any more web services to be requested, the processing returns to Step 104 to repeat the same processing. On the other hand, if it is judged that there are no more web services to be requested, then that means that all web services to have been requested were successful. Therefore, controller 14 transfers the GBPID to the history management unit 13 to instruct the update of latest GBPID DB 12. History management unit 13 then records, in latest GBPID DB 12, the GBPID received from controller 14 instead of the previous GBPID (Step 110). The controller 14 then instructs transmitter 41 to transmit an instruction to change the status of the GBPID to "COMMIT". Transmitter 41 then transmits, to GBPID server 30, the instruction to change the status of the GBPID to "COMMIT" (Step 113).

On the other hand, in Step 106, if the information indicates the failure of the web services, controller 14 instructs transmitter 41 to transmit an instruction to change the status of the GBPID to "ROLLBACK" and to cancel the update. Transmitter 41 then instructs GBPID server 30 to put the GBPID in the ROLLBACK status (Step 111). Transmitter 41 then instructs the corresponding provider 20 to cancel updates performed on the GBPID up to this point (Step 112).

Next, description will be given of the operation of provider 20 upon a request for a business process.

Figure 11:
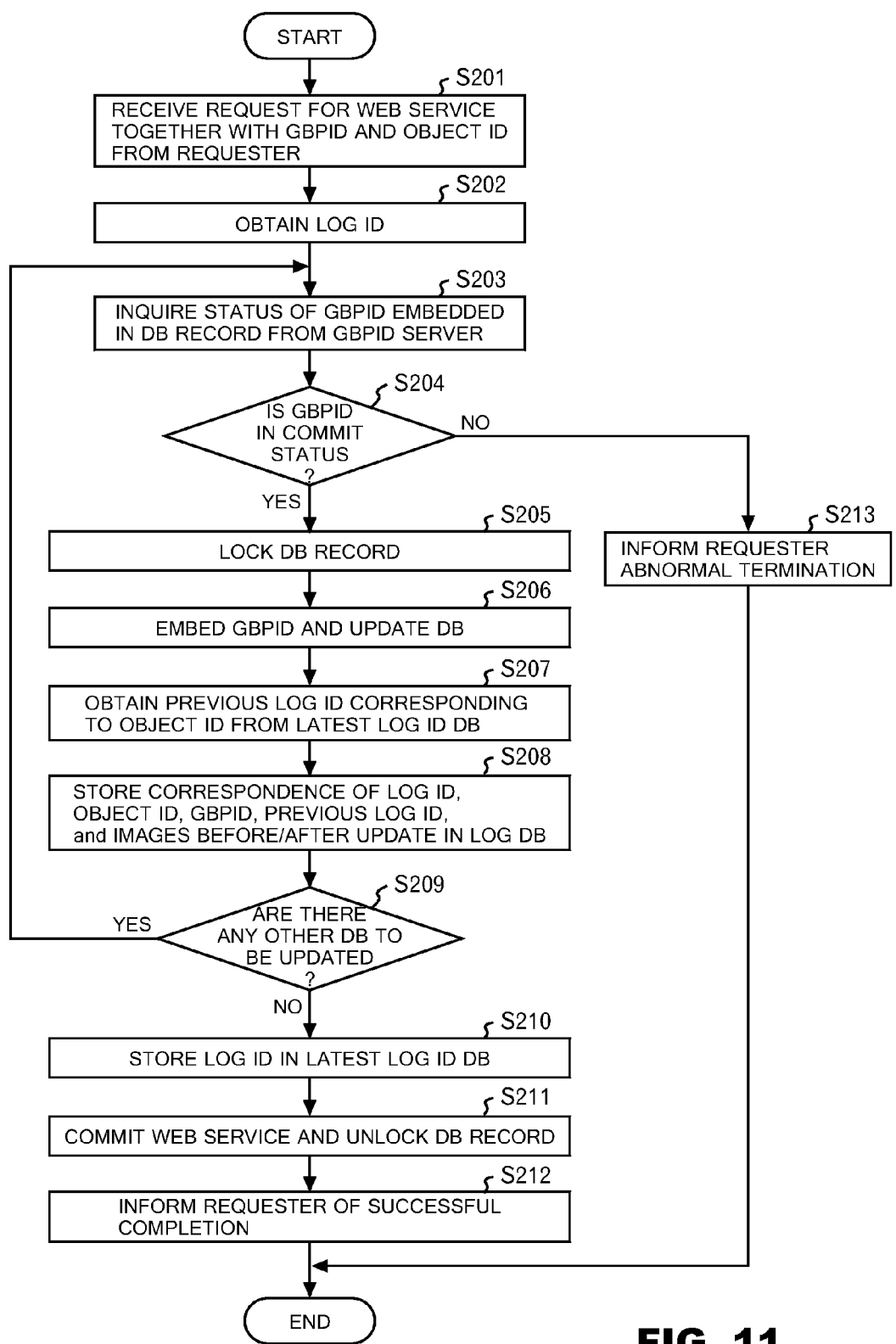
FIG. 11 is a flow chart showing an operational example at the time when a provider executes business processes according to an embodiment of the present invention.

FIG. 11 is a flowchart showing an operational example of provider 20 at this point, according to an embodiment of the invention.

In provider 20, receiver 52 first receives, from the requester, a request for a web service along with a GBPID and an object ID, and transfers the request to controller 24 (Step 201). Controller 24 then instructs log ID acquisition unit 25 to acquire a log ID, and log ID acquisition unit 25 then obtains the log ID uniquely numbered in provider 20 and transfers the log ID to controller 24 (Step 202).

Next, when updating the DB, controller 24 instructs transmitter 51 to transmit an instruction to judge the status of the GBPID embedded in the record targeted for the update in the application DB. Transmitter 51 then inquires of GBPID server 30 the status of the GBPID embedded in the record in the application DB, and transfers the inquiry result to controller 24 (Step 203). Controller 24 then judges whether or not the GBPID is in the COMMIT status, based on the inquiry result received from transmitter 51 (Step 204).

If it is judged that the GBPID is in the COMMIT status here, the application DB record is updatable. Hence, controller 24 transfers the GBPID received from receiver 52 to DB updating unit 26, and instructs the update of the application DB record. DB updating unit 26 then performs the following operation.

Specifically, DB updating unit 26 first locks the application DB record (Step 205). Next, DB updating unit 26 embeds the GBPID transferred from receiver 52 in the record to update the application DB, based on the execution of the web service (Step 206). DB updating unit 26 then returns the images of the application DB before and after the update to controller 24.

Afterwards, controller 24 instructs history management unit 23 to update log DB 21 and latest log ID DB 22. At this point, controller 24 transfers, to history management unit 23, the log ID received by the log ID acquisition unit 25 in Step 202, the object ID transferred from receiver 52, the GBPID similarly transferred from receiver 52, and the images before and after the update transferred from DB updating unit 26. History management unit 23 then performs the following operation.

Specifically, the history management unit first refers to latest log ID DB 22 to obtain a GBPID associated with the object ID (Step 207). Note that since the log ID obtained in Step 202 will be the latest log ID, the log ID obtained in Step 207 will be the previous log ID.

Next, history management unit 23 records, in log DB 21, the log ID transferred from controller 24, the GBPID similarly transferred from controller 24, the object ID similarly transferred from controller 24, the previous GBPID obtained in Step 207 and the images before and after the update transferred from controller 24 in association with each other (Step 208). The control is then returned to controller 24.

Afterwards, controller 24 judges based on the contents of the web service whether or not there are more application DBs to be updated (Step 209). If it is judged that there are any other application DBs to be updated, the processing returns to Step 203 to repeat the same processing. On the other hand, if it is judged that there are no more application DBs to be updated, then that means that all application DBs which should be updated were updated. Therefore, controller 24 transfers, to history management unit 23, the log ID to instruct the update of the latest log ID DB 22. The history management unit 23 then records, in latest log ID DB 22, the log ID transferred from controller 24, instead of the previous log ID (Step 210). Controller 24 then commits the web service, and unlocks the application DB record (Step 211). Controller 24 then instructs transmitter 51 to transmit a notification of a successful completion of the web service, and transmitter 51 informs requester 10 of the successful completion of the web service (Step 212).

On the other hand, if it is judged that the GBPID is not in the COMMIT status in Step 204, controller 24 instructs transmitter 51 to transmit a notification of an abnormal termination of the web service, and transmitter 51 informs requester 10 of the abnormal termination of the web service (Step 213).

Next, description will be given of an operation of requester 10 when performing modification REDO on the business process which has been executed by a specified GBPID.

Figure 12:
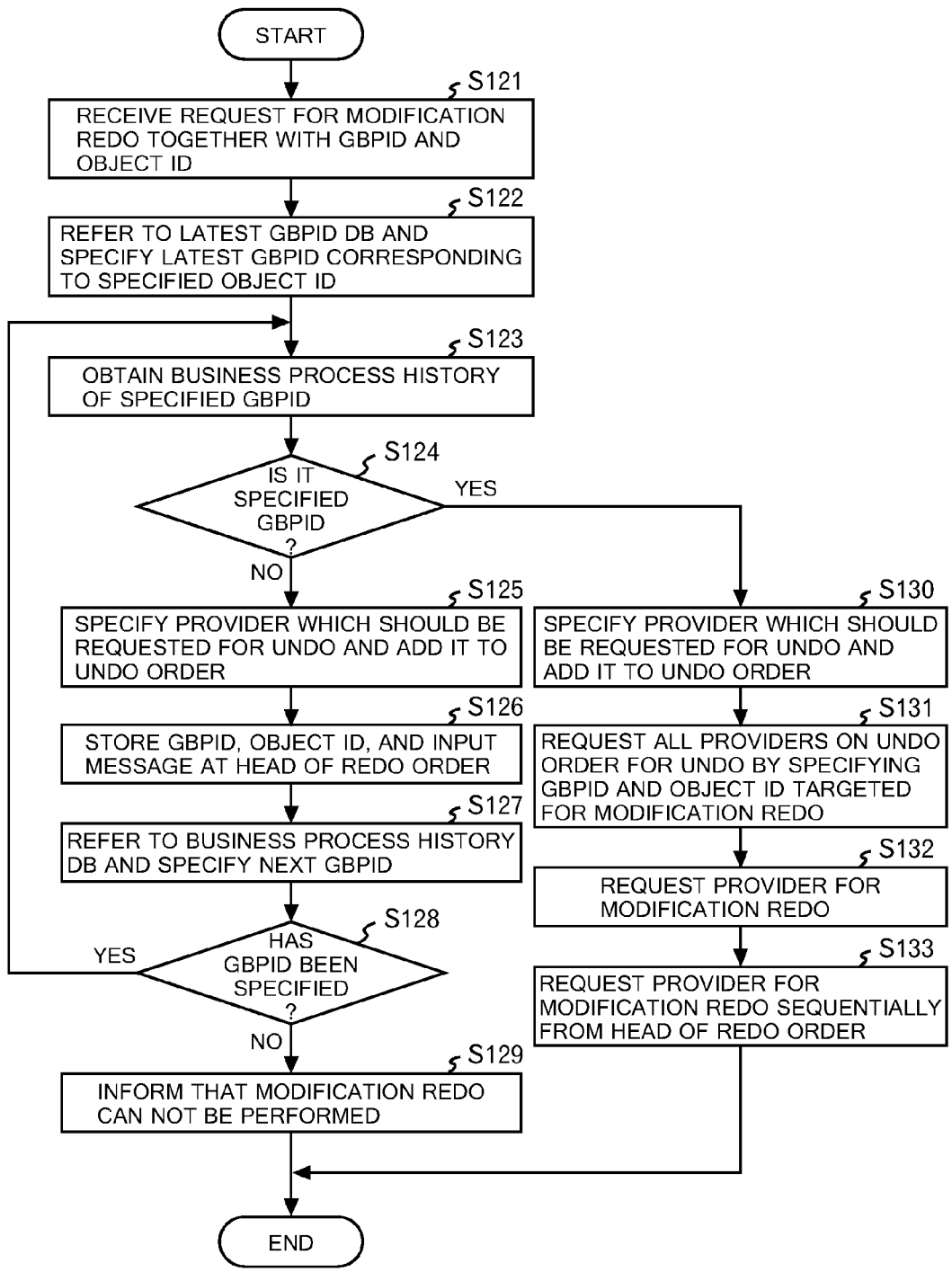
FIG. 12 is a flow chart showing an operational example at the time when a requester performs modification REDO according to an embodiment of the present invention.

FIG. 12 is a flowchart showing an operational example of requester 10 at this point.

In the requester 10, receiver 42 first receives a modification REDO request including the object ID, the GBPID, and the contents of the modification REDO, from the end user through, for example, an unillustrated HTTP server, and transfers the request to controller 14 (Step 121). Controller 14 then transfers the object ID to history management unit 13, and instructs to acquire the latest GBPID established in relation to an object specified by the object ID. History management unit 13 then refers to latest GBPID DB 12 to specify the latest GBPID corresponding to the specified object ID (Step 122).

Next, history management unit 13 reads the business process history record having the GBPID specified in Step 122 from business process history record DB 11, and transfers the business process history record to controller 14 (Step 123). Controller 14 judges whether or not the business process history record thus transferred has the GBPID specified at the modification REDO request (Step 124).

If it is judged here that the business process history record does not have the GBPID specified at the modification REDO request, the business process history record is the record of a business process executed after the business process of the GBPID on which modification REDO should be performed. Therefore, controller 14 transfers the business process history record thus read to UNDO information creator 17 and REDO information creator 18 and instructs UNDO information creator 17 to create information for UNDO and REDO information creator 18 to create information for REDO. As a result, UNDO information creator 17 and REDO information creator 18 perform the following operations.

Specifically, UNDO information creator 17 first obtains the provider name of provider 20 which should be requested to perform UNDO from the business process history record transferred from controller 14, so as to add the provider name to an UNDO order (Step 125). Additionally, REDO information creator 18 obtains the GBPID, the object ID, and the input message from the business process history record transferred from controller 14, so as to store them at the top of a REDO order (Step 126). The control is then returned to controller 14.

Afterwards, controller 14 refers to the business process history record to specify the previous GBPID (Step 127). Controller 14 then judges whether or not the previous GBPID has been specified (Step 128).

If it is judged that the previous GBPID has been specified, the processing returns to Step 123 to repeat the same processing for the specified GBPID.

On the other hand, if it is judge that the previous GBPID has not been specified, then that means that it had reached a business process history record of the oldest GBPID stored in business process history DB 11. Therefore, controller 14 instructs transmitter 41 to transmit information that it is not possible to perform modification REDO, and transmitter 41 transmits the information to the end user through, for example, a HTTP server (Step 129).

Moreover, if it is judged in Step 124 that the transferred business process history record has the GBPID specified at the modification REDO request, the business process history record is a business process history record of the GBPID on which the modification REDO should be performed. Hence, controller 14 transfers the read business process history record to UNDO information creator 17 to instruct the creation of information for UNDO. UNDO information creator 17 then obtains, from the business process history record transferred from controller 14, the provider name of the provider 20 should be requested to perform UNDO, so as to add the provider name to an UNDO order (Step 130). The control is then returned to controller 14.

Afterwards, controller 14 instructs transmitter 41 to request all providers 20 including the provider names in the UNDO order to perform UNDO, while specifying the GBPID targeted for modification REDO and the object ID. Transmitter 41 then transmits the UNDO requests to the instructed providers 20 while specifying the GBPID targeted for modification and the object ID (Step 131). Furthermore, controller 14 instructs transmitter 41 to transmit the modification REDO request based on the modification REDO contents received in Step 121. Transmitter 41 then transmits the modification REDO request to the relevant providers 20 (Step 132). Moreover, controller 14 instructs transmitter 41 to sequentially request of providers 20 for the REDO from the top of the REDO order. Transmitter 41 then transmits the REDO request to the relevant providers 20 in accordance with the REDO order (Step 133).

Next, description will be given of the operations of provider 20 when performing the modification REDO on a business process which has been executed by a specified GBPID. Since the operations of provider 20 at this time are different depending whether an UNDO request is received, a modification REDO request is received, or a REDO request is received, these cases will be described separately.

The description will first be given of the case where an UNDO request is received from requester 10.

Figure 13:
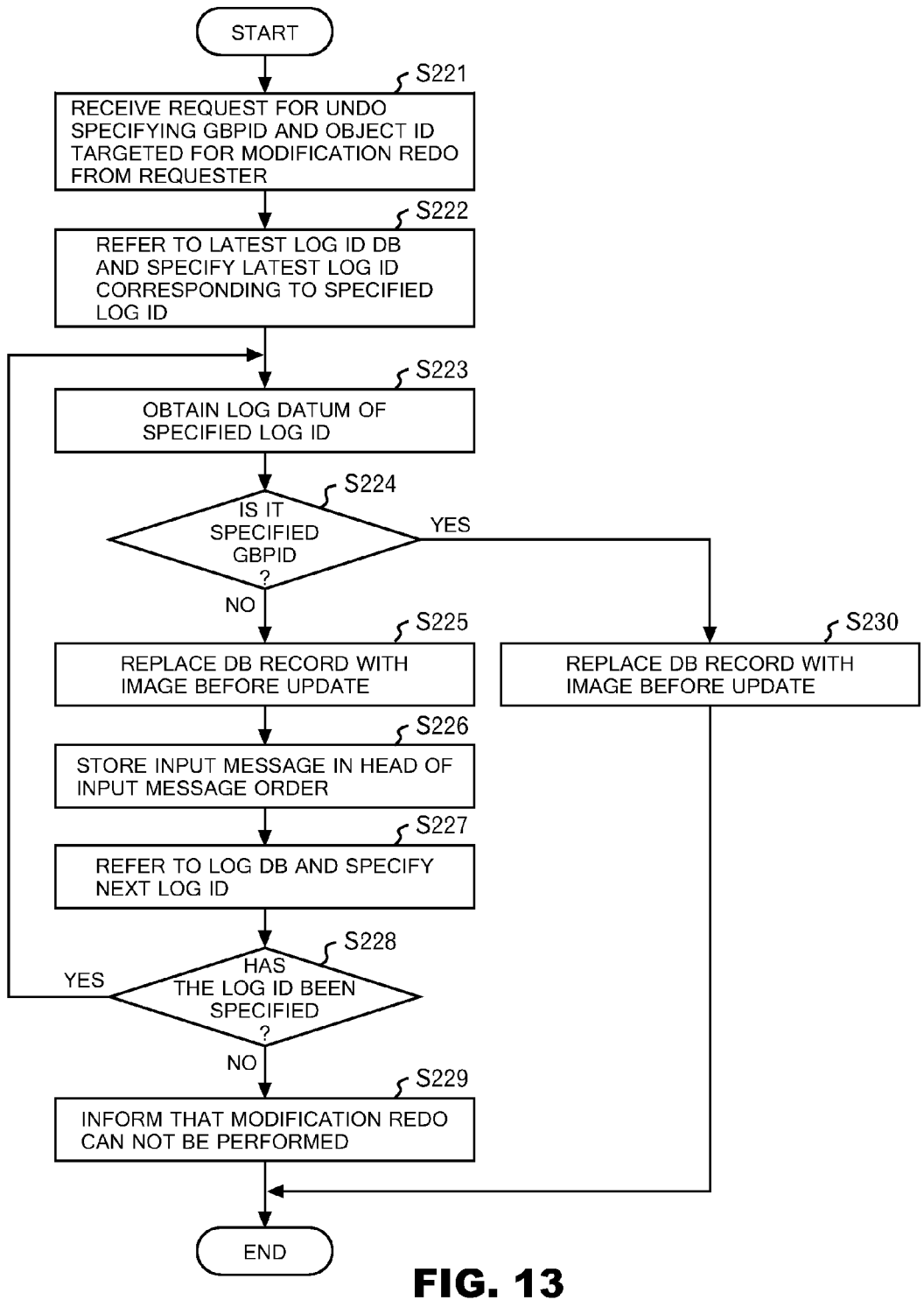
FIG. 13 is a flow chart showing an operational example at the time when a provider performs UNDO according to an embodiment of the present invention.

FIG. 13 is a flowchart showing an operational example of provider 20 of when receiving the UNDO request from requester 10 according to an embodiment of the invention.

In provider 20, receiver 52 first receives, from requester 10, the UNDO request along with the GBPID and the object ID that are targeted for the modification REDO, and transfers the UNDO request to controller 24 (Step 221). Controller 24 transfers the object ID to history management unit 23, and instructs history management unit 23 to obtain the latest log ID established in relation to an object specified by the object ID. History management unit 23 then refers to latest log ID DB 22 to specify the latest log ID corresponding to the specified object ID (Step 222).

Next, history management unit 23 reads, from log DB 21, a log datum having the log ID specified in Step 222, and transfers the log datum to controller 24 (Step 223). Controller 24 then judges whether or not the transferred log datum has the GBPID specified at the UNDO request (Step 224).

If it is judged here that the log datum does not have the GBPID specified at the UNDO request, the log datum is a log datum based on a business process executed after the business process of GBPID on which the modification REDO should be performed. Therefore, controller 24 transfers the read log datum to UNDO processor 27 and instructs UNDO processor 27 to perform an UNDO process. UNDO processor 27 then performs the following operations.

Specifically, UNDO processor 27 first obtains a before-update DB image from the log datum transferred from controller 24, and replaces an object specified by the designated object ID, that is, a record of a application DB, with the before-update DB image (Step 225). Moreover, UNDO processor 27 obtains an input message from the log datum, and stores therein the input message at the top of an input message order (Step 226). The control is then returned to controller 24.

Afterwards, controller 24 refers to the log datum, and specifies the previous log ID (Step 227). Then, controller 24 judges whether or not the previous log ID has been specified (Step 228).

If it is judged that the previous log ID has been specified, the processing returns to Step 223 to repeat the same processing for the specified log ID.

In contrast, if it is judged that the previous log ID has not been specified, then that means it had reached a log datum of the oldest log ID stored in the log DB 21. Therefore, controller 24 instructs transmitter 51 to transmit information that it is not possible to perform an UNDO process, and transmitter 51 transmits the information to requester 10 (Step 229).

Furthermore, if it is judged in Step 224 that the transferred log datum has the GBPID specified at the UNDO request, the log datum is a log datum based on the business process of the GBPID on which the modification REDO should be performed. Consequently, controller 24 transfers the read log datum to UNDO processor 27 to instruct to perform the UNDO process. UNDO processor 27 then obtains a before-update DB image from the log datum transferred from controller 24, and replaces an object specified by the designated object ID, that is, the record of an application DB targeted for the update, with the before-update DB image (Step 230). However, in this case, since the REDO process is performed at the modification REDO request to be separately transmitted from requester 10, the preparation process for the REDO is not performed, and the process is terminated.

Next, operations performed by provider 20 upon reception of a modification request from requester 10 do not change from the operations performed at the normal web service request. Hence, the detailed description will be omitted here. However, the modification REDO needs to be performed with not a current date but a past date.

Next, descriptions will be given of the operations performed upon reception of a REDO request from requester 10.

Figure 14:
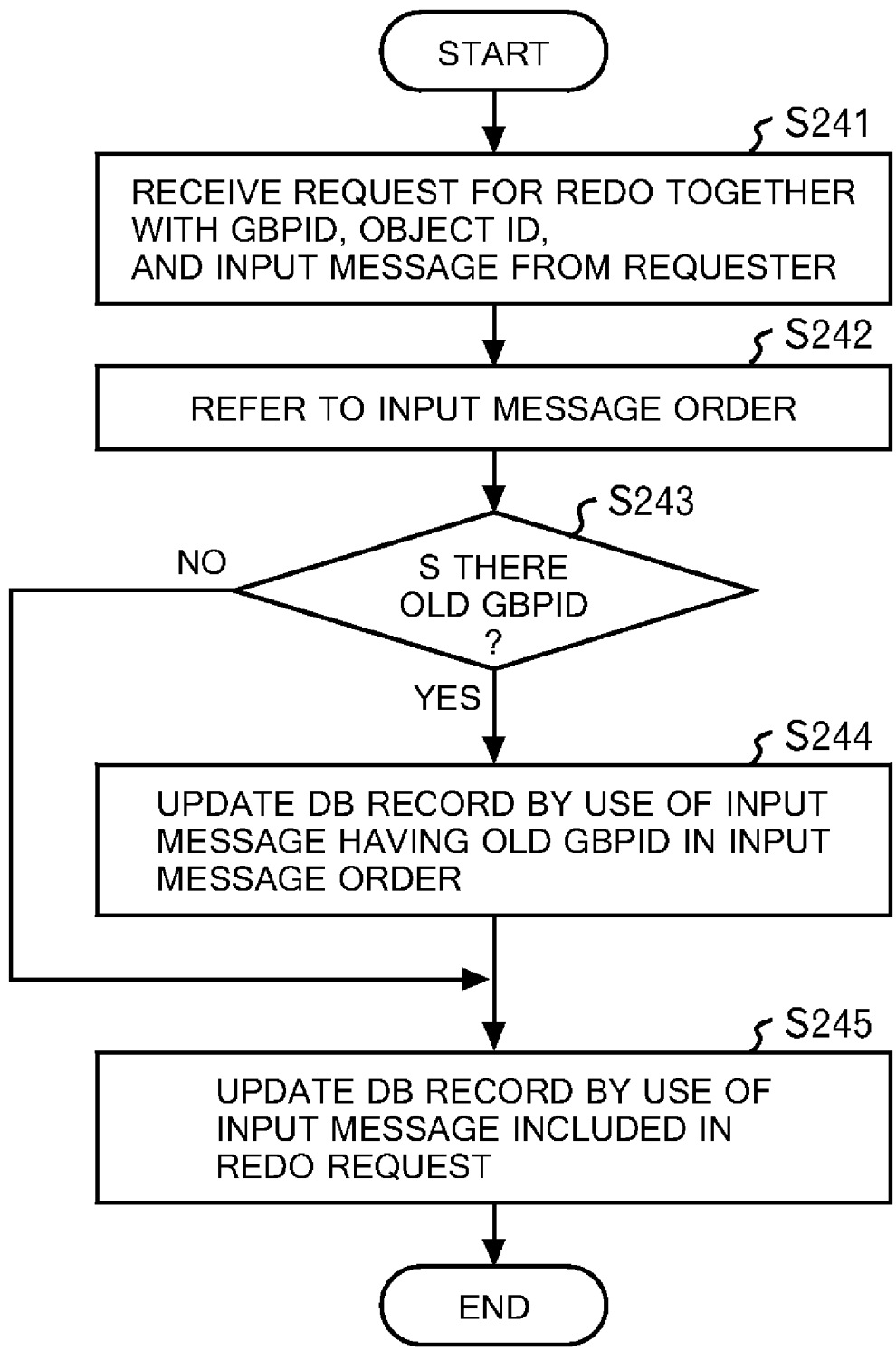
FIG. 14 is a flow chart showing an operational example at the time when a provider performs REDO according to an embodiment of the present invention.

FIG. 14 is a flowchart showing an operational example of provider 20 of when receiving a REDO request.

In provider 20, receiver 52 first receives, from receiver 52, the REDO request along with the GBPID, the object ID and the input message, and transfers the REDO request to controller 24 (Step 241). The controller 24 then refers to the input message order created in the UNDO process shown in FIG. 13 from the top (Step 242). However, it is assumed that among messages included in the input message order, messages are already completed REDOing are deleted from the input message order. In this state, controller 24 judges whether or not there is an input message of an older GBPID than the input message received in Step 241 at the top of the input message order (Step 243).

If there is no input message of an old GBPID, controller 24 transfers the input message included in the REDO request to REDO processor 28 and instructs to perform the REDO process. REDO processor 28 then performs the REDO process by use of the input message thus transferred from the controller 24 (Step 245).

In contrast, if there is an input message of an old GBPID, controller 24 first transfers the input message included in the input message order to REDO processor 28 and instructs to perform the REDO process. REDO processor 28 then performs the REDO process by use of the input message transferred from controller 24 (Step 244). Afterwards, controller 24 transfers the input message included in the REDO request to REDO processor 28 and instructs to perform the REDO process. REDO processor 28 then performs the REDO process by use of the input message transferred from controller 24 (Step 245).

Note that although whether or not to embed a GBPID in the record in log DB 21 and in latest log ID DB 22 when updating the DBs was not mentioned in the above description, at least there is no need to embed a GBPID in the record in log DB 21. A GBPID may be embedded in the record in latest log ID DB 22 similarly to the other application DBs.

Additionally, when implementing an embodiment of the invention, it is expected to have the configuration of such an application that the REDO process is basically closed in provider 20 and that the other processes (by other providers 20) are not started.

Incidentally, it is assumed, in an embodiment of the invention, that a process provided by each provider 20 is the DB update. However, even if a process provided by each provider 20 is extended beyond the DB update, an embodiment of the invention can be implemented.

As described above, an embodiment of the invention is configured such that: a requester records a business process history; each provider stores therein the log datum of a DB update; each provider executes UNDO based on the log datum; and the requester sequentially executes the REDO of business processes on the basis of the business process history. Therefore, it is made easy to implement UNDO/REDO in an application which implements a business process with a combination of web services including a plurality of DB updates.

Figure 15:
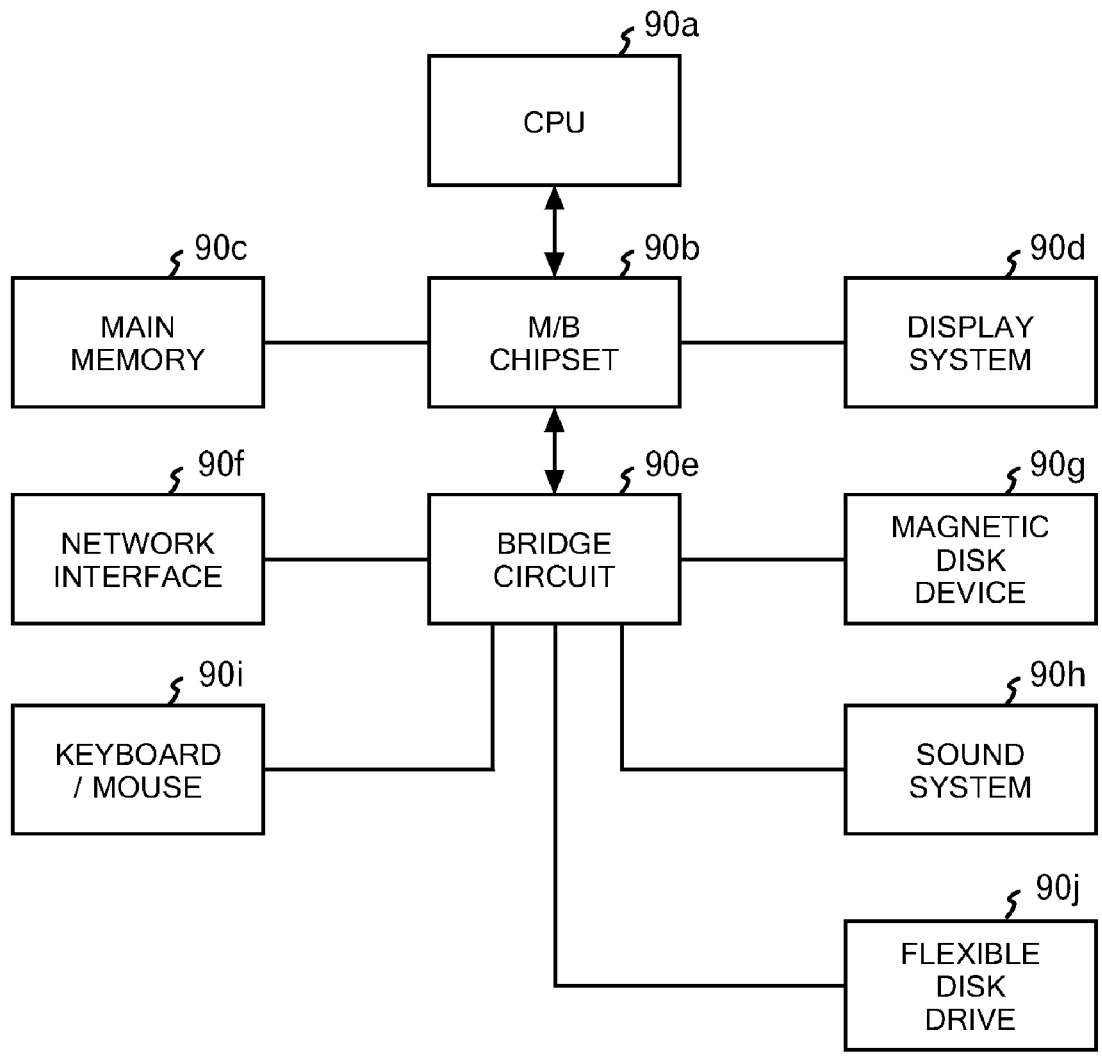
FIG. 15 is a view showing a hardware configuration of a computer applicable for an embodiment of the present invention.

Lastly, description will be given of a hardware configuration of a computer, which is favorable to apply an embodiment of the invention. FIG. 15 is a view showing an example of such a hardware configuration of a computer according to an embodiment of the invention. As illustrated, the computer includes a central processing unit (CPU) 90a being operation means, a main memory 90c connected to the CPU 90a via a mother board (M/B) chipset 90b, and a display system 90d connected to the CPU 90a similarly via the M/B chipset 90b. Furthermore, a network interface 90f, a magnetic disk device (HDD) 90g, a sound system 90h, a keyboard/mouse 90i, and a flexible disk drive 90j are connected to the M/B chipset 90b via a bridge circuit 90e.

Note that in FIG. 15, each constituent element is connected via a CPU bus. For example, CPU 90a and M/B chipset 90b, M/B chipset 90b and main memory 90c are connected to each other via the CPU bus. In addition, M/B chipset 90b and display system 90d may be connected via an accelerated graphics port (AGP), but when display system 90d includes a PCI Express-capable video card, M/B chipset 90b and the video card are connected via a PCI Express (PCIe) bus. Moreover, the PCI Express, for example, can be used to connect network interface 90f to bridge circuit 90e. In addition, a serial AT attachment (ATA), ATA of parallel transfer, and peripheral components interconnect (PCI), for example, can be used to connect magnetic disk device 90g to bridge circuit 90e. Furthermore, universal serial bus (UBS) can be used to connect keyboard/mouse 90i and flexible disk drive 90j to bridge circuit 90e.

The present invention may be implemented by hardware alone or software alone. Furthermore, the present invention may be implemented by both hardware and software. In addition, the present invention can be implemented as a computer, a data processing system, and a computer program. The computer program can be stored in a computer-readable medium to be offered. Here, the term "computer-readable media" includes an electronic, magnetic, optical, electromagnetic, infrared or semiconductor system (device or apparatus). In addition, the computer program can be stored in a propagated medium. Moreover, media which are readable by a computer include a semiconductor, a solid-state storage, a magnetic tape, a removable computer diskette, a random access memory (RAM), a read only memory (ROM), a rigid magnetic disk, and an optical disk. A compact disk-read only memory (CD-ROM), a read only memory, a compact disk-read/write (CD-R/W), and a DVD are included as an example of the optical disk at the present time.

The present invention enables UNDO and REDO in an environment where processes provided by a plurality of providers are performed in response to the request of a requester.

As described above, the description has been given of an embodiment of the invention of the present invention; however, the technical scope of the present invention is not limited to the above embodiment. It is obvious to those skilled in the art that modifications can be made and that alternative aspects can be adopted, without departing from the spirit and the scope of the present invention.

What is claimed is:

1. An apparatus for controlling execution of a plurality of transactions in each of which one or more processes provided by providers are performed in response to a request of a requester, wherein the requester comprises:
a first storage for storing therein first history information showing a provider requested to perform each process in each of the plurality of transactions, wherein the first storage stores therein the first history information on each of the plurality of transactions in association with first identification information for identifying the each of the transactions and second identification information for identifying a transaction executed before or after the each of the transactions;
a specifying unit for specifying a requested provider based on the first history information in response to a request for re-execution of a specific transaction out of the plurality of transactions, the requested provider having been requested to perform, and having performed, each process in each of transactions after the specific transaction, wherein the specifying unit specifies a transaction executed after the specific transaction, based on the first and second identification information;
an acquisition unit for acquiring third identification information for identifying a first transaction out of the plurality of transactions;
a transmitter for transmitting, to the requested provider, a request for the process in the first transaction together with the third identification information, and
a cancellation instruction unit for instructing the requested provider which is specified by the specifying unit, to cancel the requested processes in all the transactions executed after the specific transaction, and wherein each of the plurality of providers comprises:

a second storage for storing therein second history information showing a status before performing a new cycle of the process in a corresponding one of the transactions in response to the request of the requester;

a cancellation unit for cancelling the process in the corresponding one of the transactions based on the second information in response to the cancellation instruction from the cancellation instruction unit, the transactions having been executed in response to other requests of the requester after the specific transaction;

a receiver for receiving, from the requester, the request for the process together with the third identification information; and a processor for:

storing fourth identification information for identifying a second transaction in association with the process in the second transaction to be executed;

performing the process in the first transaction when information that the process in the second transaction has been completed is stored in association with the fourth identification information;

storing the third identification information in association with the process in the first transaction; and upon completion of the process in the first transaction, storing information that the process in the first transaction has been completed, in association with the third identification information.

2. The apparatus according to claim 1, wherein the requester further comprises a re-execution instruction unit for instructing all the requested providers specified by the specifying unit to re-execute all the processes of the transactions executed after the specific transaction, and each of the plurality of providers further comprises a re-execution unit for re-executing the process in the corresponding one of the transactions executed after the specific transaction, upon receipt of the re-execution instruction from the re-execution instruction unit, without changing an order relation between the process executed in response to the request for the corresponding transaction and other processes executed in response to other requests different from the request.

3. The apparatus according to claim 2, wherein the second storage stores therein the second history information on each of the plurality of transactions in association with identification information identifying the each of the transactions and the order of the each of the transactions, and the re-execution unit specifies, based on the identification information, the order relation between the process executed in response to the request for the corresponding transaction and the other processes executed in response to the other requests different from the request.

4. The apparatus according to claim 1, wherein the process is a process for updating a database held by each of the plurality of providers, and the second history information includes an image of the database before an update.

5. A method for controlling execution of a plurality of transactions in each of which one or more processes provided by providers are performed in response to a request of a requester, the method comprising:

the requester storing first history information showing a provider that was requested to perform each process in each of the plurality of transactions, wherein storing the first history information includes storing, for each of the plurality of transactions, first identification information for identifying the each of the transactions and second identification information for identifying whether a transaction was executed before or after the each of the transactions;

each of the plurality of providers storing second history information showing a status before performing the process in a corresponding one of the transactions in response to the request of the requester;

in response to a request for re-execution of a specific transaction out of the plurality of transactions, the requester specifying, based on the first history information, a provider which has performed each process in transactions after the specific transaction, and the requester specifying a transaction executed after the specific transaction, based on the first and second identification information;

the requester instructing all the requested providers specified to cancel the processes in all the transactions executed after the specific transaction; and upon receipt of the cancellation instruction, each of the plurality of providers cancelling, based on the second history information, the process, which has been performed in response to the request of the requester, in a corresponding one of the transactions executed after the specific transaction;

the requester acquiring third identification information for identifying a first transaction out of the plurality of transactions;

the requester transmitting, to the requested provider, a request for the process in the first transaction together with the third identification information; and each of the plurality of providers:

receiving, from the requester, the request for the process together with the third identification information;

storing fourth identification information for identifying a second transaction in association with the process in the second transaction to be executed;

performing the process in the first transaction when information that the process in the second transaction has been completed is stored in association with the fourth identification information;

storing the third identification information in association with the process in the first transaction; and upon completion of the process in the first transaction, storing information that the process in the first transaction has been completed, in association with the third identification information.

6. The method according to claim 5, further comprising:

the requester performing the steps of:

instructing all the specified providers to re-execute all the processes of the transactions executed after the specific transaction; and wherein the method further comprises each of the plurality of providers performing the steps of:

re-executing the process in the corresponding one of the transactions executed after the specific transaction responsive to receipt of the re-execution instruction, wherein the re-executing does not change an order relation between the process executed in response to the request for the corresponding transaction and other processes executed in response to other requests different from the request.

7. The method according to claim 6, wherein the each of the plurality of providers storing second history information further comprises:
storing, for each of the plurality of transactions, identification information identifying the each of the transactions and the order of the each of the transactions; and
wherein each of the plurality of providers re-executing the process further comprises:
specifying, based on the identification information, the order relation between the process executed in response to the request for the corresponding transaction and the other processes executed in response to the other requests different from the request.

8. The method according to claim 5, wherein
the processes of each of the plurality of providers include processes for updating respective databases of the providers; and
the second history information of each of the plurality of providers includes an image of the database before an update.

9. An apparatus for controlling execution of a plurality of transactions in each of which one or more processes provided by providers are performed in response to a request of a requester wherein
the requester comprises:
a first history information storage for storing therein history information including a first transaction ID of each of the plurality of transactions, a second transaction ID of a transaction executed immediately before each of the transactions, and a provider ID of a provider which has been requested to perform a process in each transaction;
a first management information storage for storing therein management information for managing a latest transaction ID of a latest transaction;
a specifying unit for specifying a provider ID of a requested provider in response to a request for re-execution of a specific transaction out of the plurality of transactions, the requested provider having been requested to perform, and having performed, each process in each of transactions after the specific transaction, the provider ID being specified by tracing history information from history information including the latest transaction ID as the first transaction ID, to history information including a transaction ID of the specific transaction as the first transaction ID, through history information including the second transaction ID as the first transaction ID;
a cancellation instruction unit for instructing all the providers with the provider IDs specified by the specifying unit to cancel the requested processes in all the transactions executed after the specific transaction; and
a re-execution instruction unit for instructing all the providers with the provider IDs specified by the specifying unit to re-execute the requested processes in all the transactions executed after the specific transaction, and
each of the plurality of providers comprises:
a second history information storage for storing therein history information including a first log ID of a log of a process, which has been performed in response to the request of the requester, in a corresponding one of the plurality of transactions, a second log ID of a log of a process immediately before the process, a third transaction ID of a transaction in which the process is performed, and status information showing a status before performing the process;
a second management information storage for storing therein management information for managing a latest log ID of a latest log;
a cancellation unit for cancelling, by use of the status information, the process in the corresponding one of the transactions in response to the cancellation instruction from the cancellation instruction unit, the transactions having been executed in response to other requests of the requester after the specific transaction, and the process being canceled by tracing history information from history information including the latest log ID as the first log ID, to history information including a transaction ID of the specific transaction as the third transaction ID through history information including the second log ID as the first log ID; and
a re-execution unit for, upon receipt of the re-execution instruction from the re-execution instruction unit, re-executing the process with a certain transaction ID in the corresponding one of the transactions executed in response to a certain request from the requester after the specific transaction, after executing a process which has been performed with an older transaction ID than the certain transaction ID in response to a request different from the certain request.

10. An apparatus for controlling execution of a plurality of transactions in each of which one or more processes provided by providers are performed in response to a request of a requester, wherein
the requester comprises:
a first storage for storing therein first history information showing a provider requested to perform each process in each of the plurality of transactions;
a specifying unit for specifying a requested provider based on the first history information in response to a request for re-execution of a specific transaction out of the plurality of transactions, the requested provider having been requested to perform, and having performed, each process in each of transactions after the specific transaction;
a cancellation instruction unit for instructing the requested provider which is specified by the specifying unit, to cancel the requested processes in all the transactions executed after the specific transaction; and
a re-execution instruction unit for instructing all the requested providers specified by the specifying unit to re-execute all the processes of the transactions executed after the specific transaction; and
wherein each of the plurality of providers comprises:
a second storage for storing therein second history information for each of the plurality of transactions in association with identification information identifying the each of the transactions and the order of the each of the transactions, the second history information including a status before performing a new cycle of the process in a corresponding one of the transactions in response to the request of the requester;
a cancellation unit for cancelling the process in the corresponding one of the transactions based on the second information in response to the cancellation instruction from the cancellation instruction unit, the transactions having been executed in response to other requests of the requester after the specific transaction; and a re-execution unit for re-executing the process in the corresponding one of the transactions executed after the specific transaction, upon receipt of the re-execution instruction from the re-execution instruction unit, without changing an order relation between the process executed in response to the request for the corresponding transaction and other processes executed in response to other requests different from the request; and wherein the apparatus comprises a server for independently supplying the providers the identification information identifying the each of the transactions and the order of the each of the transactions and the status before performing a new cycle of the process in a corresponding one of the transactions, so that the re-execution unit specifies the order relation between the process executed in response to the request for the corresponding transaction and the other processes executed in response to the other requests different from the request without a re-execution dependency arising between the re-execution unit and the requester.

\* \* \* \* \*